United States Patent
Stewart et al.

(10) Patent No.: US 7,451,852 B2
(45) Date of Patent: Nov. 18, 2008

(54) VEHICLE SOBRIETY INTERLOCK SYSTEM WITH PERSONAL IDENTIFICATION ELEMENT

(75) Inventors: Jeffrey Stewart, Melbourne, FL (US); James McClelland, Cocoa, FL (US); Charles E. Smith, Merritt Island, FL (US)

(73) Assignee: Sherman Enterprises, Inc., Marietta, GA (US)

( * ) Notice: Subject to any disclaimer, the term of this patent is extended or adjusted under 35 U.S.C. 154(b) by 133 days.

(21) Appl. No.: 11/683,115

(22) Filed: Mar. 7, 2007

(65) Prior Publication Data
US 2007/0144812 A1      Jun. 28, 2007

Related U.S. Application Data

(63) Continuation-in-part of application No. 10/485,041, filed on Jan. 23, 2004, now Pat. No. 7,204,335, which is a continuation-in-part of application No. PCT/US03/34650, filed on Oct. 31, 2003.

(51) Int. Cl.
*B60K 28/00* (2006.01)

(52) U.S. Cl. .................. 180/272; 422/84; 340/576; 73/23.3

(58) Field of Classification Search ................ 180/272; 422/84; 340/426.11, 576; 73/23.3; 600/532
See application file for complete search history.

(56) References Cited

U.S. PATENT DOCUMENTS

| | | | |
|---|---|---|---|
| 3,764,270 A | 10/1973 | Collier et al. | |
| 3,831,707 A | 8/1974 | Takeuchi | |
| 4,093,945 A | 6/1978 | Collier et al. | |
| 4,738,333 A | 4/1988 | Collier et al. | |
| 4,749,553 A | 6/1988 | Lopez et al. | |
| 4,809,810 A | 3/1989 | Elfman et al. | |
| 4,902,628 A | 2/1990 | Blair | |
| 6,167,746 B1 | 1/2001 | Gammenthaler | |
| 6,726,636 B2 * | 4/2004 | Der Ghazarian et al. | 600/532 |
| 6,748,792 B1 * | 6/2004 | Freund et al. | 73/23.3 |
| 6,853,956 B2 * | 2/2005 | Ballard et al. | 702/183 |
| 6,956,484 B2 | 10/2005 | Crespo | |
| 6,967,581 B2 * | 11/2005 | Karsten | 340/576 |
| 7,256,700 B1 * | 8/2007 | Ruocco et al. | 340/576 |
| 7,341,693 B2 * | 3/2008 | Der Ghazarian et al. | 422/84 |
| 7,400,258 B2 * | 7/2008 | Crespo | 340/573.1 |
| 2002/0084130 A1 | 7/2002 | Der Ghazarian et al. | |
| 2003/0176803 A1 | 9/2003 | Gollar | |
| 2004/0158430 A1 * | 8/2004 | Ballard et al. | 702/183 |
| 2005/0241871 A1 | 11/2005 | Stewart et al. | |

* cited by examiner

*Primary Examiner*—Toan C To
(74) *Attorney, Agent, or Firm*—Larson & Larson, PA; James E. Larson; Herbert W. Larson

(57) ABSTRACT

An interlock system for measuring the sobriety of a potential motorized apparatus operator is coupled to the starting mechanism of said motorized apparatus. The interlock system includes a microprocessor controlled handset, base unit and photographic device. The photographic device facilitates the identification process of the person taking the test by taking at least two consecutive pictures, one before and one during the test, which makes circumvention of the test a recordable event for later viewing by a monitoring person or facility. Further, rolling re-tests are used in the event the motorized apparatus was allowed to engage and operate and to once again verify the blood alcohol content of the person operating said apparatus and verify their identity during said test with said photographic device.

33 Claims, 18 Drawing Sheets

VEHICLE SOBRIETY INTERLOCK SYSTEM WITH PERSONAL IDENTIFICATION ELEMENT

PRIOR APPLICATIONS

This application is a continuation-in-part basing priority on application Ser. No. 10/485,041, filed on Jan. 23, 2004, which in turn bases priority on international application S.N. PCT/US2003/034650, filed on Oct. 31, 2003.

BACKGROUND OF THE INVENTION

1. Field of the Invention

This invention relates to an improved sobriety interlock system. More particularly, it relates to a sobriety interlock system for use in vehicles, motorized machinery apparatus and with individual location verification computer monitoring equipment, the system incorporating anti-circumvention features, a personal identification element and an improved sampling system to provide for more accurate measurements of the blood alcohol content of an individual using said system.

2. Background of the Prior Art

Breathalyzer testing and sobriety interlock devices for use in vehicles, such as automobiles and trucks, are well known in the prior art. These known types of devices work on a principle that the breath of a person who has consumed alcoholic beverages can be sampled to determine the corresponding blood alcohol content (blood to alcohol ratio) of that person. Using known levels of blood alcohol content, it can then be determined whether someone has too much alcohol in their system which would affect their ability to operate said vehicle by law or by court order for repeat drunk driving offenders. For instance, many states use a level of 0.08 as a percentage of blood alcohol content which acts as a presumption that a person is intoxicated and unable to drive a vehicle.

Early advancements in breathalyzer testing devices can be seen in U.S. Pat. No. 3,764,270 to Collier et al. wherein an alcohol concentration measuring apparatus is disclosed. In this reference it is noted that the operation of vehicles and machinery by persons intoxicated by alcohol is a major health problem in many places in the world and especially in the United States. The device of this prior art reference teaches that deep lung breaths are required to measure an accurate blood alcohol content from a gas sample or more accurately, the breath. Accordingly, improvements over then existing prior art devices are made in this Collier et al. reference that address measuring the alcohol concentration by ensuring a continuous and uninterrupted flow of gas from a subject using such device. However, it is not contemplated that this device could then be interfaced with the starting mechanism of a vehicle in the event that a predetermined threshold of the measured blood alcohol content is exceeded. This feature is clearly needed.

Subsequent devices seen in the prior art has addressed the need for a sobriety measuring device to be interfaced with a vehicle's starting mechanism—a so called "interlock" device. For instance, U.S. Pat. No. 3,831,707 to Takeuchi describes an early interlock device which takes a series of measurements to determine the temperature, humidity and alcohol concentration of the vehicle operator's breath. These measurements can be taken after the ignition switch of the vehicle (i.e., automobile) is engaged, thereby permitting the operator of the vehicle to warm up the car, by blowing into a sampling apparatus. Predetermined permitted ranges are set within the device for these three measurements. If the three readings fall within the permitted ranges (all three conditions passing), then the automobile's transmission can be engaged and the car can be operated. If not (the test fails), the transmission of the automobile will not engage thereby preventing operation of the vehicle based upon an assumption that the operator is intoxicated and therefore lacking the required mental faculties to operate the vehicle. The temperature and humidity readings are used to sense that the air subjected to the sampling apparatus is in fact a human breath. Accordingly, these readings assist somewhat in the anti-circumvention of the interlock device. However, temperature and humidity can fluctuate substantially depending on the climate in which the vehicle is located and thereby affect the test being taken. Accordingly, there is a great need to improve upon temperature and humidity sensing systems that work in coincidence with the alcohol sensors to provide more accurate measurements for interlock devices. Further, other more sophisticated anti-circumvention features are needed in interlock devices to thwart attempts by users to fool the device thereby permitting their vehicle to be operated when it clearly should not.

Other advancements in the prior art for sobriety interlock devices have been made that do not directly address temperature and humidity sensing. In particular, advancements in measuring a continuous and uninterrupted flow of breath for the sampling device can be seen in U.S. Pat. No. 4,093,945 to Collier, et al, which again addresses the need for sampling a deep lung breath since it is known that, absent some flow rate measurement equalization algorithm within an interfacing software program, deep lung breath samples are more apt to provide an accurate measurement of the blood alcohol content of the test taker than a short and shallow breath. The device of this prior art reference works to exclude breath samples that are not deep lung samples thereby requiring the individual taking the test to repeat the test until the device indicates that the breath sample was a deep lung breath sample. Unfortunately, this device can be difficult to use since not all individuals are capable of providing a deep lung sample needed to take the measurement. Improvements for measuring the flow rate of the breath samples are certainly needed. Such improvements should utilize an interfacing software program that can operate to equalize the breath samples through algorithmic offset calculations regardless of how deep or how shallow they are to provide the most accurate measurement possible.

Still other advancements in prior art interlock devices address operator identity. Since most states in the U.S. have already mandated the use of interlock devices for convicted DUI (driving under the influence of alcohol) offenders, operator identity of an unsupervised test can be critical. It is quite reasonable to assume that an inebriated vehicle operator may simply ask a sober person to take the test for them so that the vehicle starting mechanism can be engaged upon receiving a "pass" result since the test would be otherwise unsupervised. Although this act in itself is certainly punishable by a fine or even incarceration in most states, it most likely has occurred and will continue to occur in the future. Accordingly, the inventions seen in U.S. Pat. No. 4,738,333 to Collier, et al, and U.S. Pat. No. 4,809,810 to Elfman, et al, and U.S. Published Application No. US 2002/0084130 to Der Ghazarian, et al, were all developed to address operator identity so that the person mandated (by a Court for example) to take the sobriety test before the vehicle can be operated is first identified as the individual actually taking the test. It is important to note however, that these interlock devices are known to be more complicated and thereby require more maintenance/calibration, more expense and more sophisticated circuitry.

Although there is a great need to ensure that the proper person is taking the sobriety test, such complicated and expensive devices may be overlooked and not employed due to their over-sophistication. Further, legislators are cautious about enacting laws for the use of interlock devices that employ too many complicated features. There is clearly a need to keep a sobriety interlock devices simple in its design but accurate in its measurement. Other, simpler anti-circumvention technology should be used to ensure that drunk drivers are kept off the road. Development of a secure anti-circumvention interlock device that does not involve complex personal identity scans is clearly needed.

However, this is not to say that personal identification should be not included. In fact, there is a need to develop a simpler personal identification element for use with interlock devices that absolutely ensures that the person taking the test was actually the person driving the car. Nowhere in the prior art, can you find such a device that implements an absolute identification element in coincidence with an interlock system.

Most modern interlock devices include a few common elements: a power supply, a fuel cell (alcohol sensor), a sampling system (a breath intake channel leading to the fuel cell), a microprocessor to analyze the results of the test taken by the fuel cell and an output (a relay connected in series with the starter of the vehicle). In breath analyzer devices (those which are not used as interlock devices), output relays are not necessary since such devices are not intended to prevent the operation of a vehicle but merely used to give a blood alcohol content measurement. However, other common elements can be found, even though their uses may vary. Indicative of the use of a microprocessor in a breath analyzer device (but not that necessarily of an interlock device), as shown in U.S. Pat. No. 4,749,553 to Lopez, et al, a microprocessor is employed to calculate the blood alcohol content by running an algorithm contained within the memory of the microprocessor using a plurality of signals generated by taking a sample breath, including: an alcohol signal, a distance signal to compensate for diffusion of the exhaled breath, a pressure signal and a temperature signal. These types of signals are known as environmental signals and are helpful in securing a more accurate blood alcohol content measurement based upon ambient environmental conditions which may effect the measurement and give a false positive (a test fail). However, this device lacks important anti-circumvention features which are needed for use in interlock devices for preventing false measurements intended to "fool" the analyzing device. Anti-circumvention features are critically needed in interlocking devices since almost all measurements are taken in an unsupervised location. Further, the actions of DUI offenders under a court order to have the interlocking devices installed in their automobile will be under review. It will be imperative for the supervising agency (i.e., Probation Officer) to determine whether the interlocking devices have been circumvented, tampered with or not used when instructed (i.e., "rolling repeat tests"). Accordingly, use of data logs should be employed as a deterrent to the person mandated to use the device as well as for use in monitoring the life and proper function of the interlocking device.

One example of device circumvention includes using a gas source other than a current human breath, say from a balloon, to fool the device into thinking that an actual test is being made. One method to prevent such circumvention can be seen in the device of U.S. Pat. No. 4,902,628 to Blair. This device requires a positive and negative breath sample (blowing then sucking) to provide a measurement of the breath being tested and hence the blood alcohol content of such person. This device is first blown into by the person being tested, and then the person is required to apply suction after a short time lapse. Accordingly, first and second signals are generated. If both signals are not recognized by a control means, a measurement will not be provided, the test will fail and the vehicle will not be permitted to start. This helps to ensure that an improper gas is not used to take a test on a device that merely requires the person to blow into such device. However, this type of device still could be improved by employing enhanced anti-circumvention features.

In order that an accurate reading of the blood alcohol content is measured, it is important that the fuel cell not be exposed to too much pressure from a strong breath sample or too little pressure from a shallow or weak breath sample. Some prior art devices have attempted to address this problem. In those devices that utilize a valve upstream from the fuel cell, some have used a pressure transducer to control the opening and closing of the valve. This can be seen in U.S. Published Application No. US 2003/0176803 to Gollar. In such device, the pressure transducer measures the pressure of the gas sample (human breath) and controls the opening of the valve in response to the measured pressure—a so called "constant volume" sampling system. This device integrates a pressure feedback signal to obtain a volumeric equivalent. The valve time opening varies from sample to sample based upon the measured pressure. In other words, the opening of the valve is directly dependent on the measurement taken by the pressure transducer.

A similar prior art device can be seen in U.S. Pat. No. 6,167,746 to Gammenthaler, which utilizes a normally closed valve. The valve opens to control the volume of the breath sample by measuring the pressure of the breath flow through the device and, in response to the measured pressure, electronically controls the opening of the valve and diverts a portion of the breath flow into the fuel cell. A valve controller limits the duration of time that the valve is open based upon the measured pressure of the breath flow. In other words, the valve is dependent on the valve controller which in turn is dependent on the pressure measuring device.

An improved device is clearly needed wherein the valve works independently of the pressure transducer and permits a breath sample to pass there through without regard to the amount of pressure in the sample. The improved device should instead compensate for varying pressures through an algorithmic calculation and not through electronic valve controllers and pressure measuring devices. Further, the valve should be in a normally open state to ensure that a breath sample passes over the cell in the event there is some malfunction within the device. This would ensure a breath sample is always recorded. Even though the cell may be oversaturated and this may be considered an "unfair" test, the interlock would prevent the operation of the vehicle or machinery and ensure that the person attempting to operate said vehicle or machinery is denied such operational access. Obviously, it would always be better to deny such access to a previous offender than to permit him or her to operate the motorized apparatus based upon a malfunction in the interlock device.

Further advancements to anti-circumvention have included personal identification and include features such as photo identification. Of course, this is not necessarily a means to prevent the engagement of a starter mechanism of a vehicle, for example, but instead a monitoring function for review at a later time to see who in fact used the interlock sobriety device.

One such device can be seen in U.S. Pat. No. 6,956,484 to Crespo. In such device, a photographic unit is included in the substance testing device of the invention. However, the device merely takes a photograph (operable) in response to the detection device testing a person who is affected by a controlled substance, for example alcohol. And, this result has some benefits. It would show that a person under a court order or probation or both used the interlock device and was subsequently denied access to drive and that this event was recorded with a photo. However, this does not ensure that the person mandated to use the interlock device did not a have non-intoxicated person blow, and then later say that the "non-intoxicated person drove the car . . . not me." Accordingly, this device falls short of achieving what is truly needed, a device that absolutely records what events occurred regardless of who used the interlock device. An improved interlock system with a personal identification element (i.e., photographic unit) is clearly needed.

An improved interlock system is clearly needed which can provide for a more accurate blood alcohol content measurement all the while having the necessary anti-circumvention features, which ensures the individuals will use the system as intended, and have personal identification verification elements. The system should be less complicated then those devices seen in the prior art such that greater ease of operation of the interlock can be realized. Improved accuracy should be enjoyed through a microprocessor controlled valve working independently from a pressure sensitive component. The improved system should permit the logging of data relative to the operation of the system so that a supervising agency can review the log to see if circumvention or tampering of the system has occurred and to otherwise see that the system is working properly.

Other features that monitor the status of the vehicle's movement would also help to ensure that circumvention is not attempted through idling of the vehicle while the person consumes alcohol away from the car that has already been started. Further, rolling repeat tests during operation of the automobile would help to ensure that alcohol is not being consumed by the driver during operation of the vehicle after it has been started (i.e., driving down the highway and consuming alcohol). Other improvements are also needed to ensure that the most accurate measurement is always provided. For instance, through the use of water filtering, moisture can be virtually eliminated from the breath vapor thereby avoiding moisture saturation of the fuel cell (the alcohol sensor). Improvements in temperature monitoring and temperature control of the system should also be practiced to ensure that the system works properly in cold weather climates. Finally, a repetitive identification system (with rolling re-retests) should be incorporated to ensure that the person taking the test, and supposedly operating the vehicle or machinery, is in a non-intoxicated state, and is that actual person.

SUMMARY OF THE INVENTION

We have invented an improved vehicle sobriety interlocking system that overcomes all of the short comings seen in the prior art. Our system utilizes a base unit and handset in bi-directional communication with one another and which are installed within close proximity of the driver's seat of a vehicle or the operator's area of some other piece of motorized machinery. The base unit includes at least one relay which is electrically wired in series with the starter of the vehicle or other motorized apparatus. The handset is microprocessor controlled and is used as the breath testing device and analyzer. Both the base unit and handset can be powered from the 12V DC battery of the vehicle. The base unit also contains a microprocessor which interfaces with the handset microprocessor through a high speed serial data interface.

Our system includes a handset having a front and back portion enclosing a printed circuit board. Included on the printed circuit board is a microprocessor which interprets a breath sample taken from a sampling system within the handset and thereafter sends a high speed serial data signal to the base unit microprocessor for controlling a set of relays. If the result of the sobriety test is that a predetermined threshold (for example 0.03%) has not been exceeded, then the appropriate signal is sent so that the relays change state thereby permitting the starter of the vehicle to be engaged and the vehicle to be operated. If the result of the test is that the predetermined threshold has been exceeded, then an appropriate signal is sent such that the relays do not change state whereby the starter can not be engaged and hence the vehicle can not be operated (precludes ignition). An LED display coupled to the microprocessor instructs the user when to blow and whether the test taker passed or failed the sobriety test. Other messages can be displayed, including, but not limited to, the number of days remaining before the next servicing, before the next monitoring (i.e., download) or before the next calibration.

Enclosed within the handset is a sampling system housing in communication with a breath intake port forming a breath channel. The sampling system housing includes a body portion, a fuel cell, a solenoid valve, a water filter, a housing heater, a temperature sensor and a capillary tube attached at a first end to the water filter and at a second end to a pressure transducer mounted on the printed circuit board. The breath channel has a temperature sensor mounted through the housing body for determining whether the gas sample is that of a current human breath. The water filter reduces the amount of moisture that is exposed to the fuel cell by passing alcohol vapors while precluding water in the gas sample from reaching the fuel cell. The solenoid valve is positioned upstream from the fuel cell and remains open for a finite period of time to pass the gas sample to the fuel cell. The handset microprocessor controls the opening and closing of the solenoid valve. The solenoid valve is open for a constant and finite, albeit short, period of time. The pressure transducer is coupled to the microprocessor but does not control the opening and closing of the solenoid valve but instead works to normalize the breath samples that are introduced to the breath channel through an algorithmic calculation.

A proprietary software program embedded upon the microprocessor interprets the pressure levels of the breath samples and equalizes the measurements made across the fuel cell by calculating an offset through the mathematical algorithm based upon predetermined standard breath samples. Accordingly, a standard alcohol response equation is programmed in the microprocessor. During calibration of the interlock system, the handset determines appropriate valve opening time required to achieve a particular sample based upon predetermined pressure (an example of a particular sample is 0.03% blood alcohol content). Once this value is determined, the valve opening time is fixed for each interlock system until the next time the handset is calibrated.

The pressure measurements that are used to normalize the breath samples are taken by the pressure transducer at some finite time after the solenoid valve first receives flow through the valve. The calculated offset ensures that higher flow rates due to higher pressure readings do not give false positive readings (the reverse also being true; ensures that lower flow rates due to lower pressure readings do not give off false negative readings). These components provide a more accurate reading for the novel interlock system of the present invention and also work as an anti-circumvention feature whereby the user can not fool the system by introducing a shallow low pressure breath sample.

A pair of accelerometers is mounted on the circuit board of the base unit to constantly measure movement of the vehicle in either an X or Y axis. These measurements are used to determine whether the vehicle is moving (i.e., accelerating) or turning. Accordingly, the accelerometer can be used as an anti-circumvention feature for the interlock system of the present invention. Results of these measurements are recorded in a data log which can be downloaded by a supervising agency. The data log will show whether the car was idling for any questionable amount of time. This acts as a deterrent against court mandated users from starting their vehicle when they are completely sober, driving to an establishment serving alcoholic beverages, leaving their vehicle running (idling) while they consume alcohol and then return to their vehicle to drive away drunk. Also, the accelerometers act as a bypass detector to determine whether the vehicle was moving at a time when no test by the interlock system was first initiated (vehicle was started without an interlock system test being performed).

Other anti-circumvention features include rolling repeat tests whereby the user has to blow into the mouthpiece of the handset while driving to ensure that alcohol has not been consumed since the vehicle was started. Although the interlock system of the present invention will not disable a running vehicle in the event of a failed test, the data log will record such event and expose the violation to the supervising agency at the time of download of the data log. Further, relays can switch on lights and blow the horn to attract attention to the violator. A data port, such as mini USB B, is in communication with the handset microprocessor and acts as a point of download for the data log as well as an upload point for supervisor preferences and settings. Downloads and uploads can also be effected through wireless transmission. A second proprietary software program can be used on a laptop or PC to set preferences and settings for the interlock system, to perform calibrations and to interpret the data log.

Further, a personal identification element is employed and can include photographic device, such as a camera. Said photographic unit can be in many forms, such as, for example, an interfacing camera unit connected to the base unit of the interlock system of the present invention. Said photographic unit responds to power being provided to the system and immediately records a first picture of the person attempting to use the motorized apparatus, such as a vehicle in this example. Then when prompted to provide a breath sample, through the handset, a second subsequent photo is taken. The taking of the two photos are timed (based upon the system powering up and then requiring a test) and can be timed such that it would be theoretically impossible for two people to switch positions between the taking of the two photos. Even if timed longer, and the two people can switch positions, since the second photo is taken when the test (i.e., breath sample) is given, if that shows a different person than the person who powered up the system, then that can be defined as a violation by the monitoring agency or court system. The purpose is to have the person being requested to take the test behind the wheel and in fact shown taking the test in that same position (i.e., does not hand off handset to passenger to provide sample). Further, the novel system of the present invention requires a random re-test after movement of the motorized vehicle has begun wherein another photo is taken. This ensures that a friend does not take the test and then get out of the vehicle and allow the intoxicated person to drive away. Or if they do, this event will not only record this fact but also identify both parties that are involved in these circumventive activities. This works well as a deterrent for the person who is asked to assist in the circumvention activity since contributory negligence in such an act, wherein a person is killed or seriously injured, can result in substantial civil liability as well as criminal incarceration. Still further, GPS location waypoints can also be recorded at time of taking the test to provide the monitoring agency additional information about where the offender may be going during his or her probationary period.

As used herein, vehicles and motorized machinery apparatus include, but are not limited to, automobiles, trucks, ships motorcycles, boats, planes, trains, tractors, mowers and other industrial and construction vehicles which include a motor and an ignition system.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Figure 1:
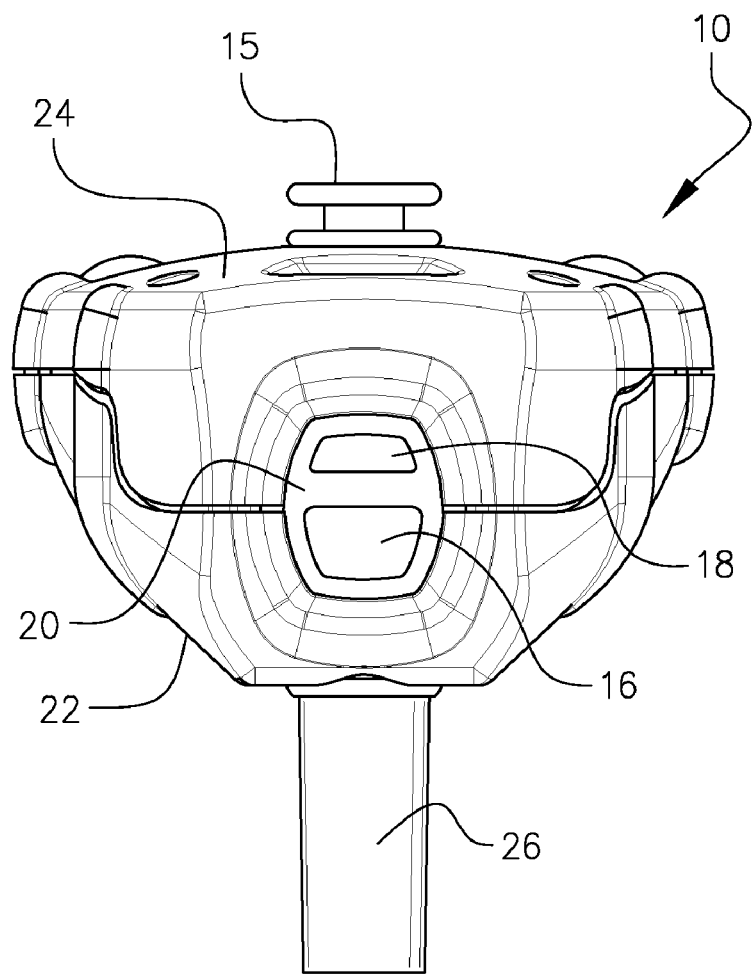
FIG. 1 is a top plan view of a handset used with an interlock system of the present invention.

Throughout the following detailed description, the same reference numerals refer to the same elements in all figures.

Figure 2:
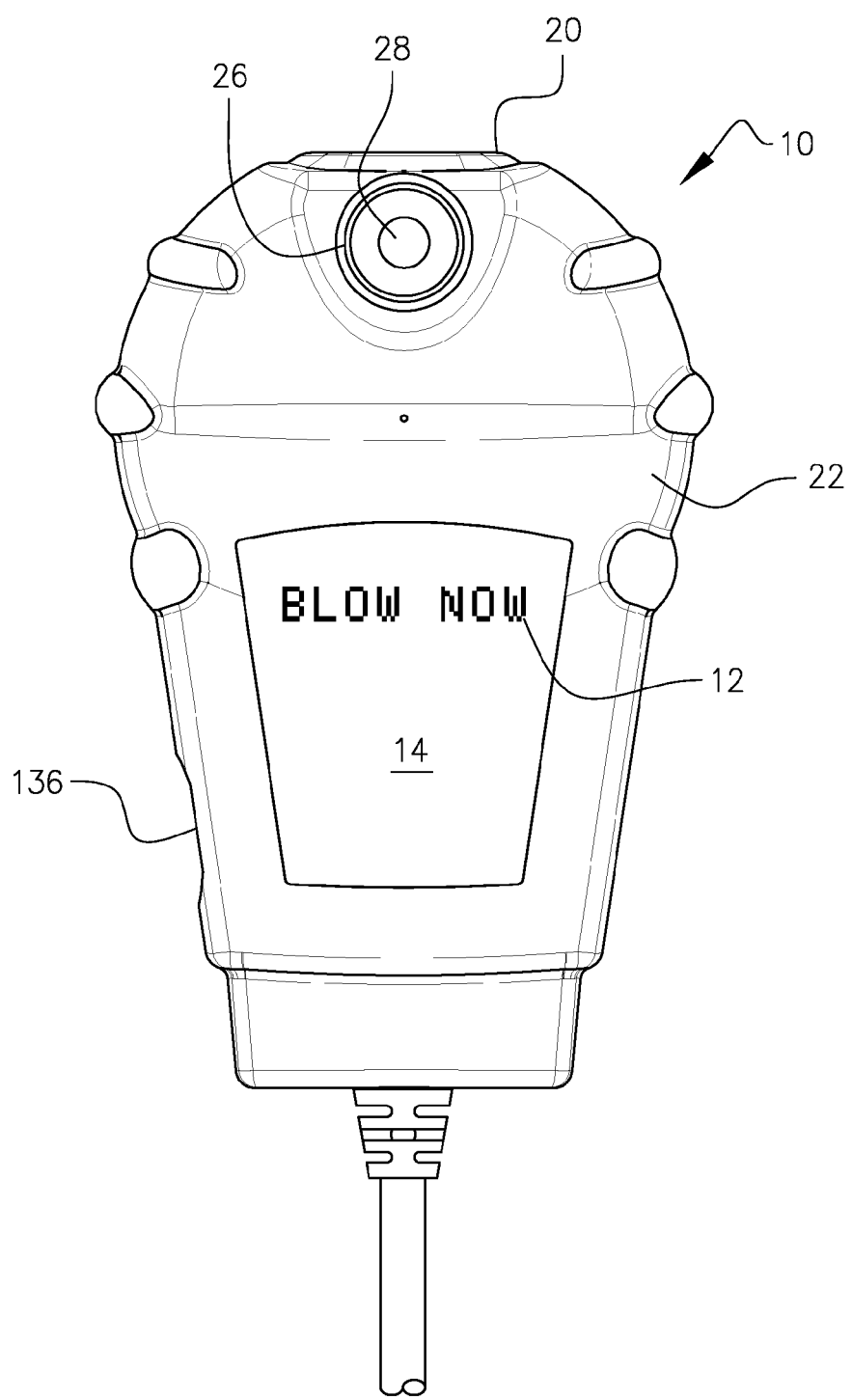
FIG. 2 is a front elevational view of the interlock system handset of the present invention depicting an LCD display employed within the system handset.

Referring to FIG. 2, a handset 10 of an interlock system of the present invention is shown. FIG. 2 illustrates a front view of handset 10 whereby a display screen 12 is clearly seen. Display screen 12 is an LED display screen (see FIG. 5) coupled to a printed circuit board (to be discussed hereinafter) enclosed within handset 10 which provides for a plurality of messages to be displayed thereon, including, but not limited to, "Warm Up", "Blow Now", "Fail" and "Pass". LED display screen 12 is covered by a tinted translucent cover 14 so that the messages on display screen 12 are visible but all other components mounted on the circuit board are not visible. As shown in FIG. 2, handset 10 has a conical shape thereby permitting handset 10 to be easily gripped by a person utilizing the interlock system.

Referring now to FIG. 1, it is shown from a top plan view that handset 10 includes a "power-on" button 16 that is first engaged to operate the interlock system of the present invention. Button 16 is located on a top portion 20 of handset 10. When depressed, button 16 engages a contact (not shown) which provides power to handset 10 and the interlock system. The interlock system of the present invention can be programmed to "time out" after a pre-determined amount of time has elapsed thereby eliminating the need for the interlock system to be powered down after each use. The interlock system essentially enters a sleep mode and waits for its next instruction to operate. However, in the alternative, the interlock system can be programmed so that it can be powered down by depressing button 16 again or simply shut off when the power source of the interlock system and handset 10 is shut down (i.e., power to an automobile in which the interlock system of the present invention is connected is shut off). Handset 10 also includes a "power on" indicator LED (not shown) positioned underneath a small cover 18 positioned juxtaposed button 16 on handset top portion 20. The indicator LED will illuminate a color, such as green, to indicate that power is being received by handset 10.

Figure 4:
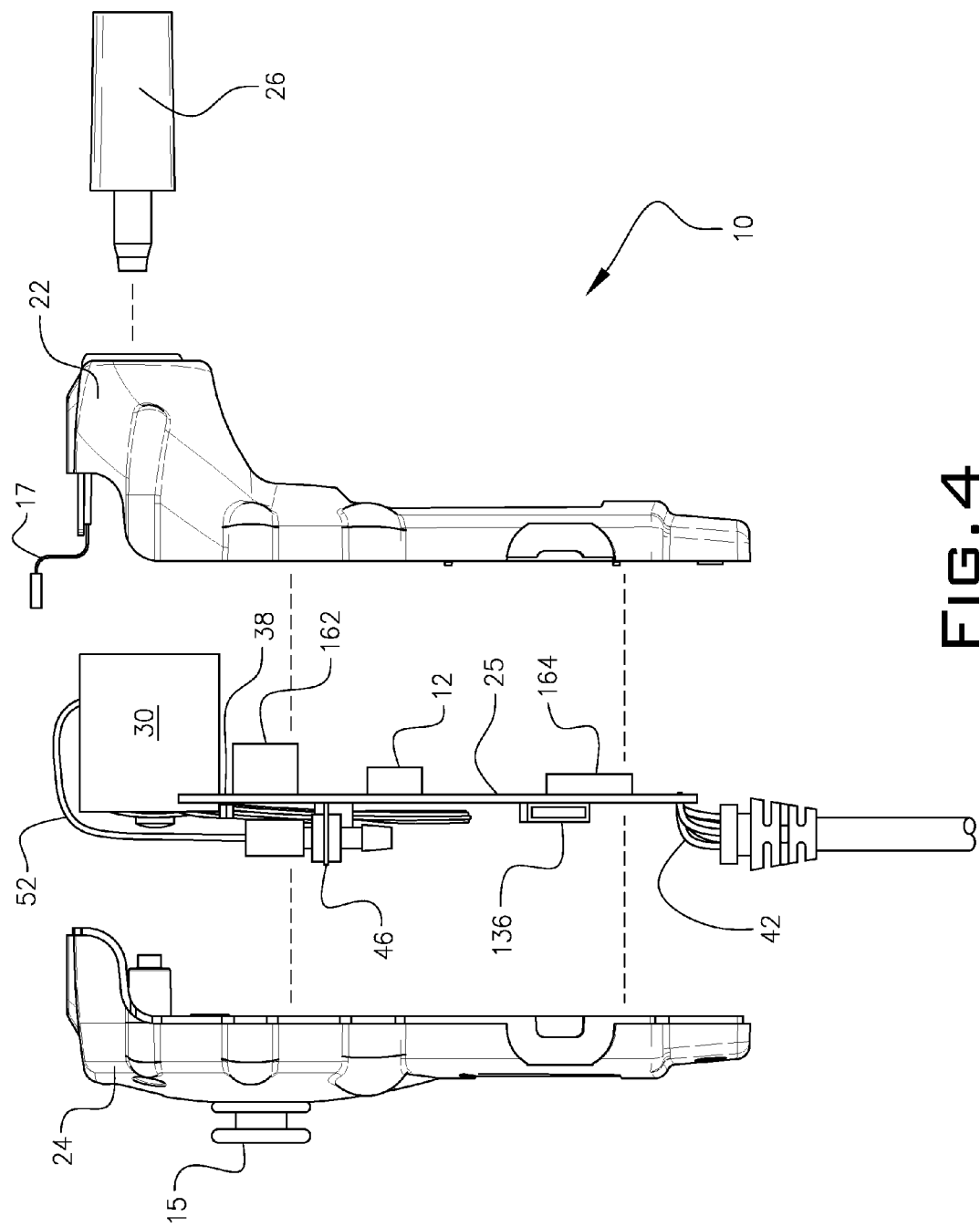
FIG. 4 is an exploded view of the interlock system handset of the present invention.

As shown in FIG. 4, handset 10 includes a front and back housing member, 22 and 24 respectively, which are used to enclose a printed circuit board (PCB) 25 within handset 10. PCB 25 contains various electrical components used for analyzing a breath sample of which will be discussed in further detail hereinafter. The two housing members 22 and 24 are attached by a plurality of screws entering back housing member 24 and inserting into front housing member 22. The "power-on" indicator LED, positioned underneath cover 18, and push button 16, as seen in FIG. 1, communicate with PCB 25 through ribbon connector 17.

Figure 3:
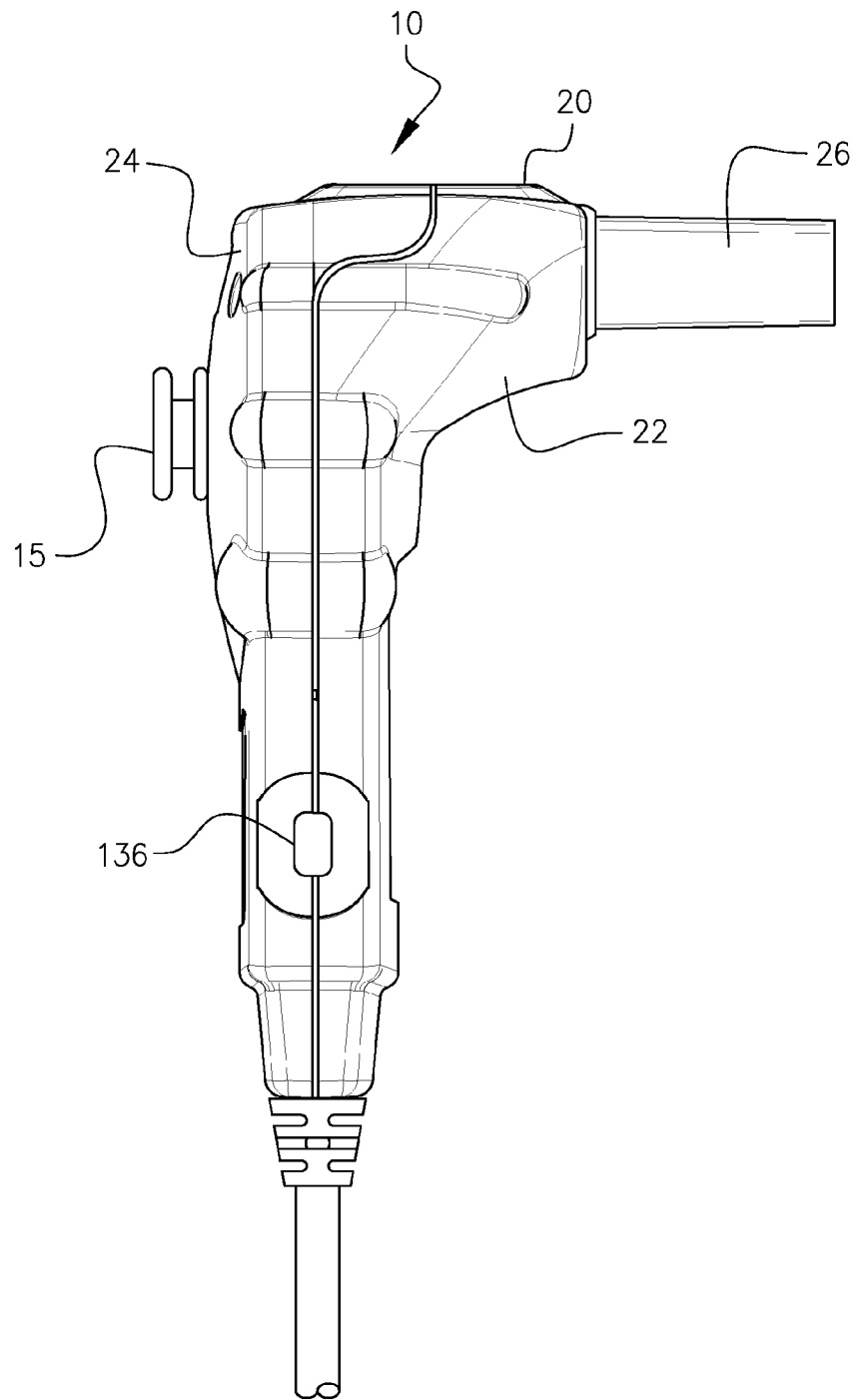
FIG. 3 is a left side elevational view of the interlock system handset of the present invention.

With continuing reference to FIG. 4, handset 10 also includes a mouthpiece 26 used to place between the lips of a person utilizing the interlock system of the present invention. Mouthpiece 26 axially aligns with a breath intake channel 28 which is formed through handset top portion 20 (see FIG. 12). In the preferred embodiment, mouthpiece 26 is secured by friction in handset top portion 20 so that it can be easily removed and replaced when necessary by a small amount of force but is retained if handset 10 is moved around. As shown in FIGS. 1, 3 and 4, a small annular mounting peg 15 is disposed along handset back housing member 24 for hanging handset 10 on a reciprocal clip (not shown) within a vehicle.

Figure 9:
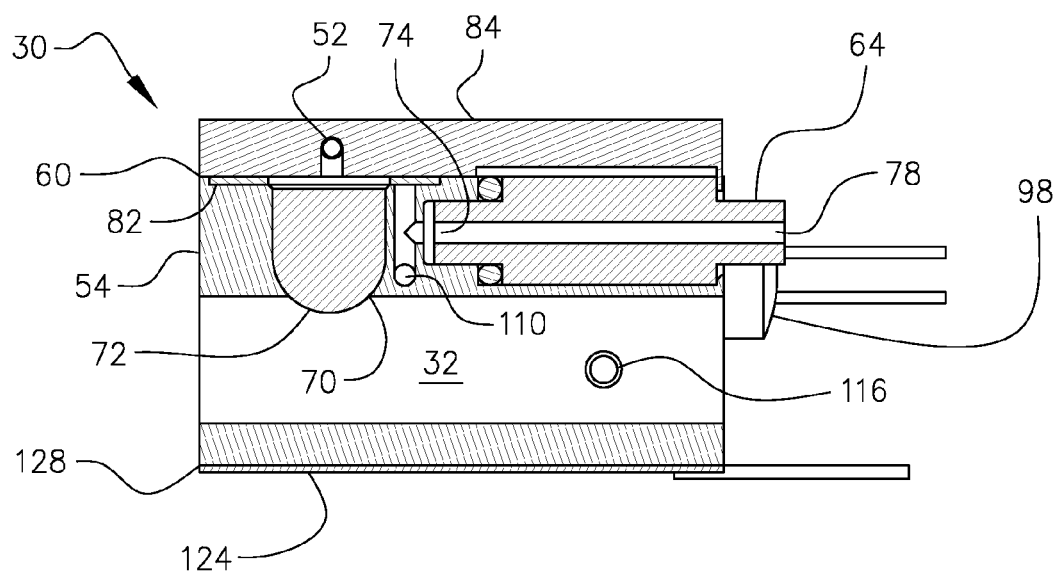
FIG. 9 is a cross-sectional view of the breath sampling housing along lines 9-9 of FIG. 8.
Figure 10:
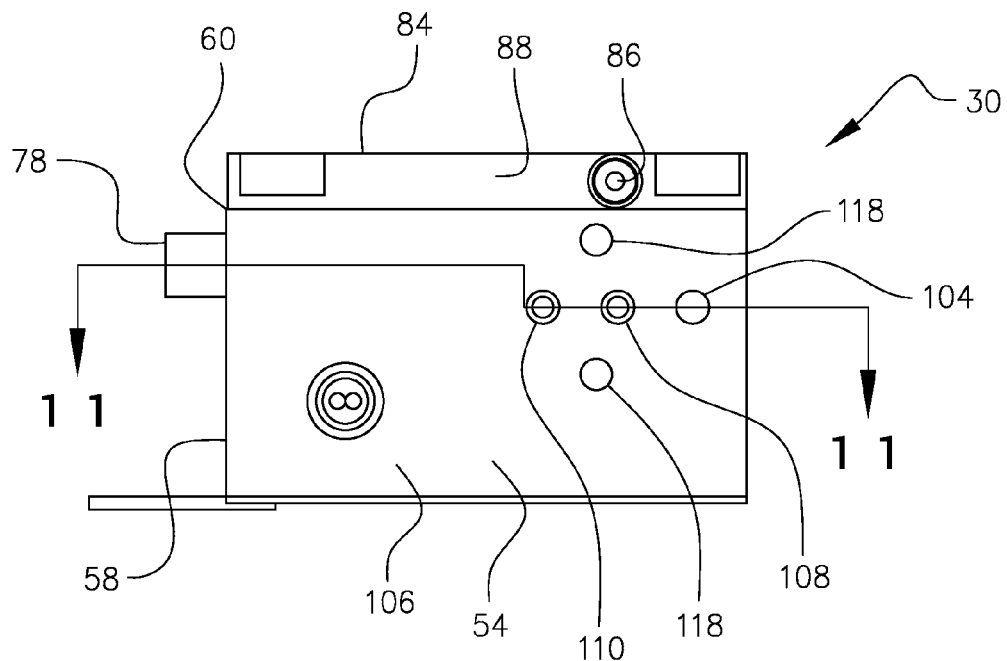
FIG. 10 is a right side elevational view of the breath sampling housing.
Figure 11:
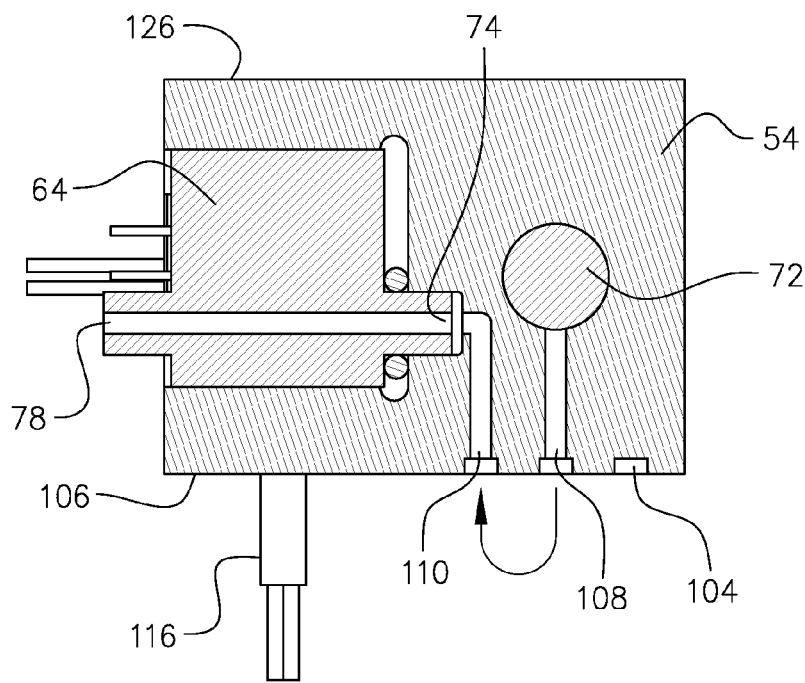
FIG. 11 is a is a cross-sectional view of the breath sampling housing along lines 11-11 of FIG. 10.

As shown in both FIGS. 3 and 4, handset top portion 20 projects outwardly. This permits a breath sampling housing 30 to be positioned within handset top portion 20 as illustrated in FIG. 4. Breath sampling housing 30 contains components used to sample the alcohol content of a breath sample blown into mouthpiece 26. Breath sampling housing 30 contains a breath sampling channel 32 (see FIG. 9) which axially aligns with mouthpiece 26 and is positioned intermediate an entrance port 34 and an exhaust port 36 of handset breath intake channel 28 (see FIG. 12).

Figure 12:
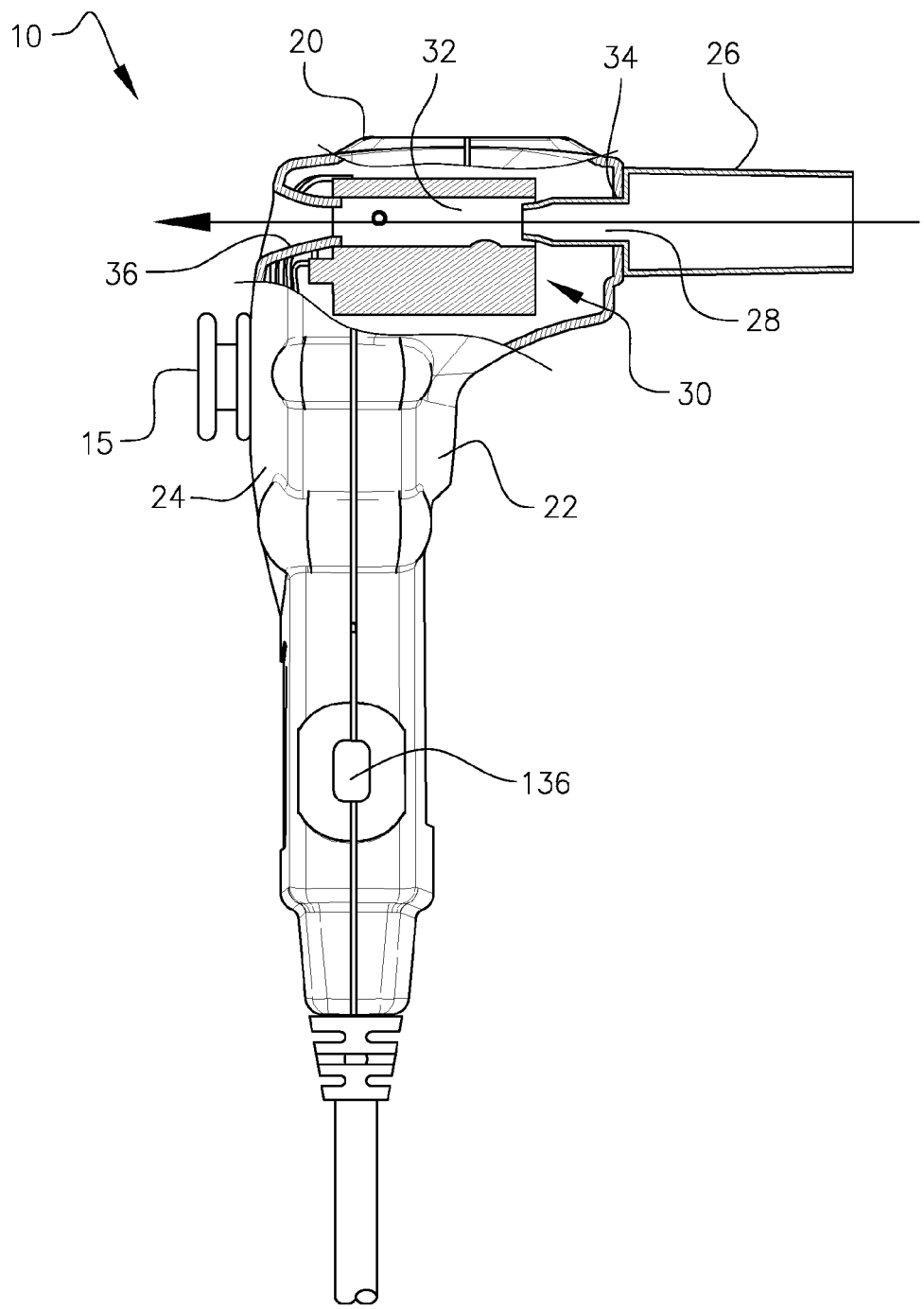
FIG. 12 is a left side elevational view, partially in section, of the interlock system handset of the present invention.

With continuing reference to FIG. 12, it can be seen how a gas sample enters handset breath intake channel entrance port 34, permits a portion of said gas sample to enter the breath sampling channel 32 of breath sampling housing 30, thereafter expelling all remaining portions of said gas sample out through handset breath intake channel exhaust port 36. For the purposes herein, and for the preferred embodiment of the present invention, gas sample means a human breath possibly containing a level of alcohol vapors within the breath.

Figure 5:
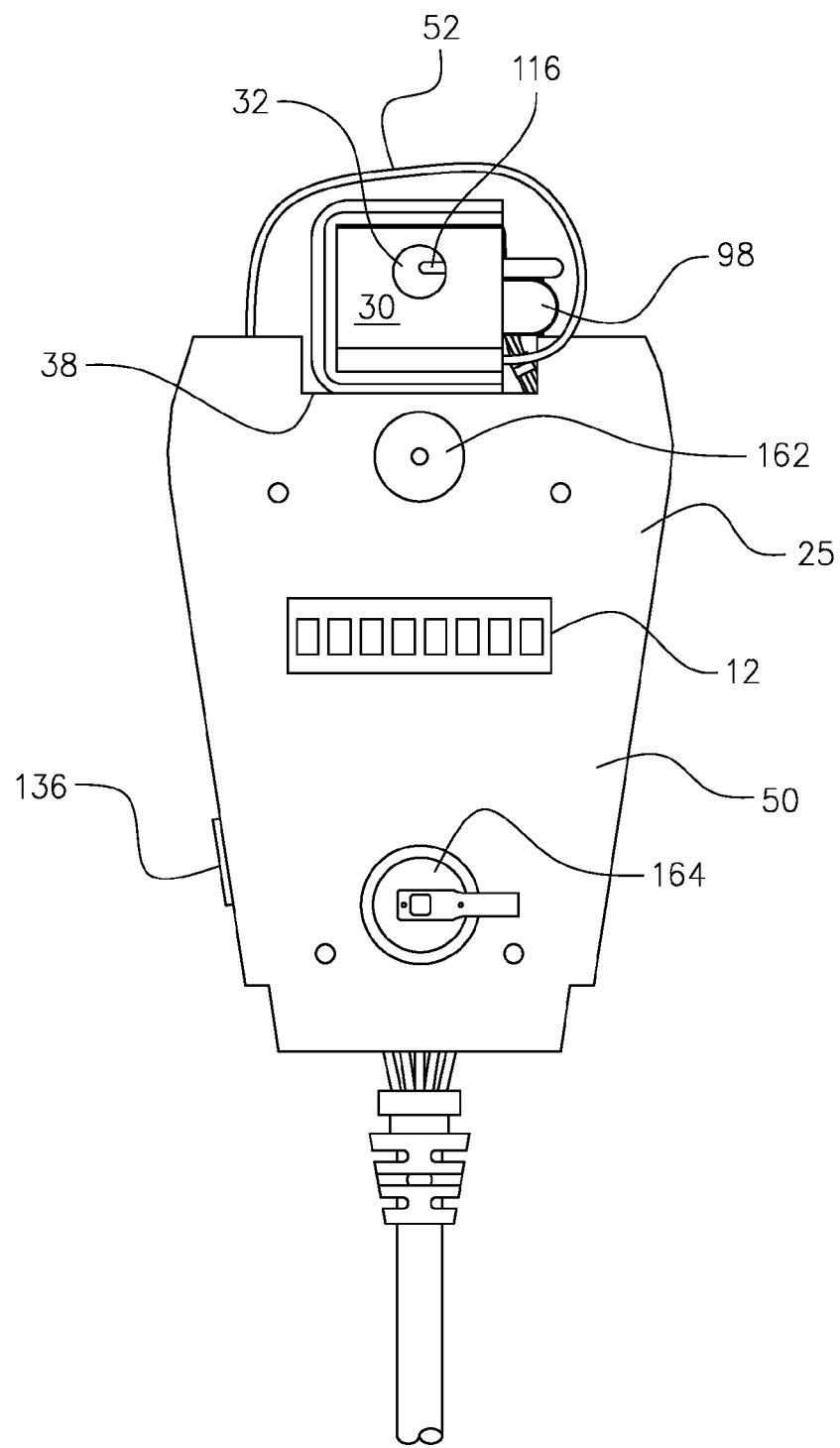
FIG. 5 is a front elevational view of a printed circuit board having a breath sampling housing mounted on a top portion thereof employed within the interlock system handset of the present invention.
Figure 6:
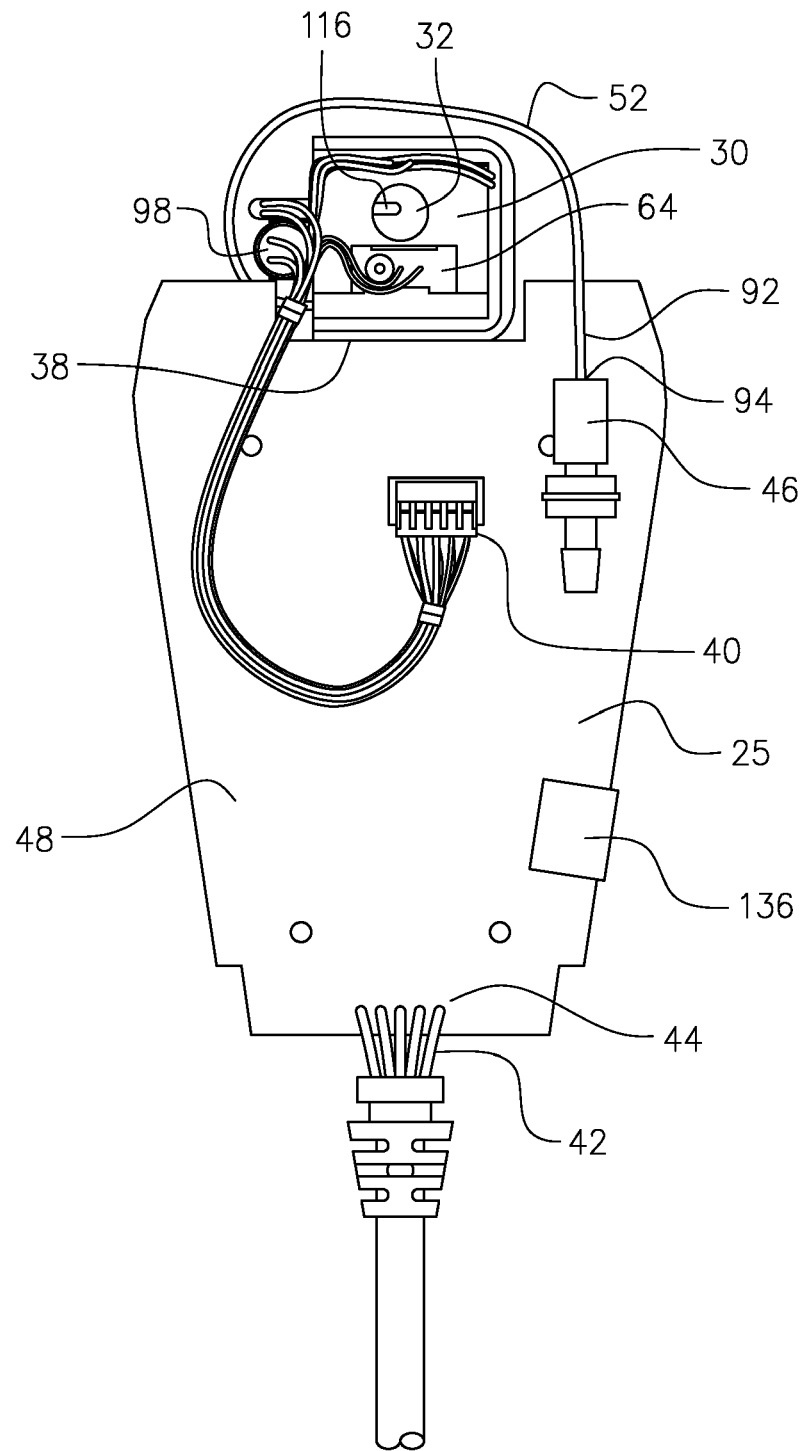
FIG. 6 is a rear elevational view of the printed circuit board having the breath sampling housing mounted on the top portion thereof employed within the interlock system handset of the present invention.
Figure 15:
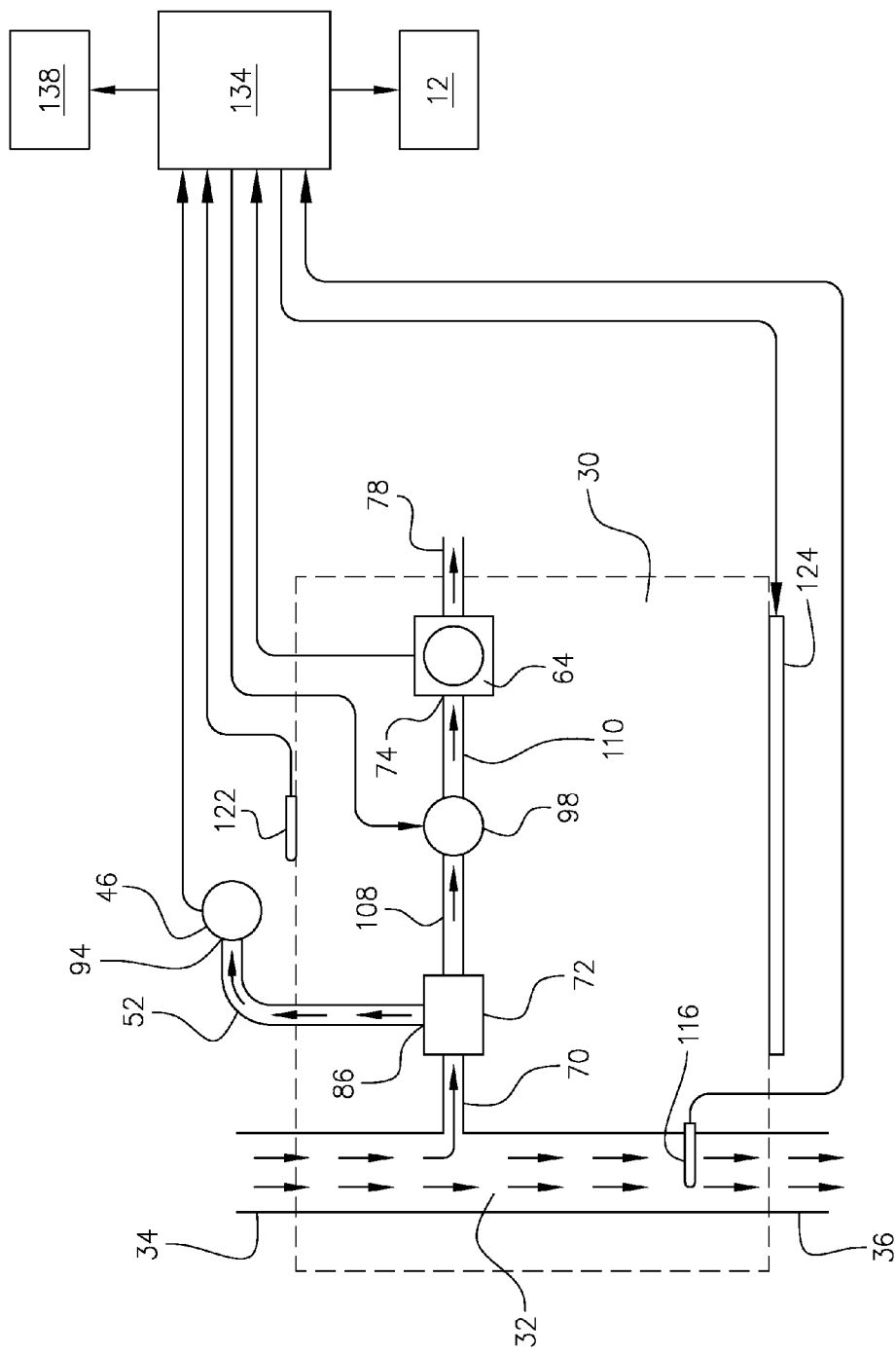
FIG. 15 is a flow diagram illustrating the manner in which air flows through the handset and the breath sampling housing and how certain measuring components of the interlock system of the present invention interact.

As shown in FIG. 6, breath sampling housing 30 mounts on a top portion 38 of PCB 25. Power to all components of breath sampling housing 30 is supplied via a first connector 40 mounted on a back side 48 of PCB 25. In the preferred embodiment, first connector 40 is a removable jumper, although first connector could be a soldered contact. PCB 25 receives its supply of power via a second connector 42 along a bottom portion 44 of PCB 25 which connects to a power source (i.e., battery—not shown) of an automobile or vehicle in which the interlock system is installed. In the preferred embodiment, second connector 42 is a soldered contact, although second connector could be constructed as a removable jumper. PCB 25 also includes a pressure transducer 46 mounted on PCB 25 back side 48. Pressure transducer 46 has a capillary tube 52 connected thereto (see FIG. 6) which feeds to breath sampling housing 30 (see FIG. 5). As shown in FIG. 15, capillary tube 52 directs a small portion of the gas sample entering breath sampling housing to pressure transducer 46 to determine a pressure value of said gas sample. As will be discussed in further detail hereinafter, the measured pressure value of the gas sample is used to calculate an offset, through an algorithmic calculation, which in turn is used to provide compensation such that an accurate measurement of the alcohol content of the gas sample can be provided.

With reference to FIG. 5, PCB 25 also includes a speaker 162 and a battery 164, both coupled to PCB 25 along front side 50. Speaker 162 provides audio signaling for power-up and power-down procedures, an indicator for test results, an indicator for circumvention warnings and as an indicator that a rolling repeat test may be required. Battery 164 supports a microprocessor of handset 10 (to be discussed in further detail hereinafter) and a clock (not shown) for handset 10, both located on PCB 25.

Figure 7:
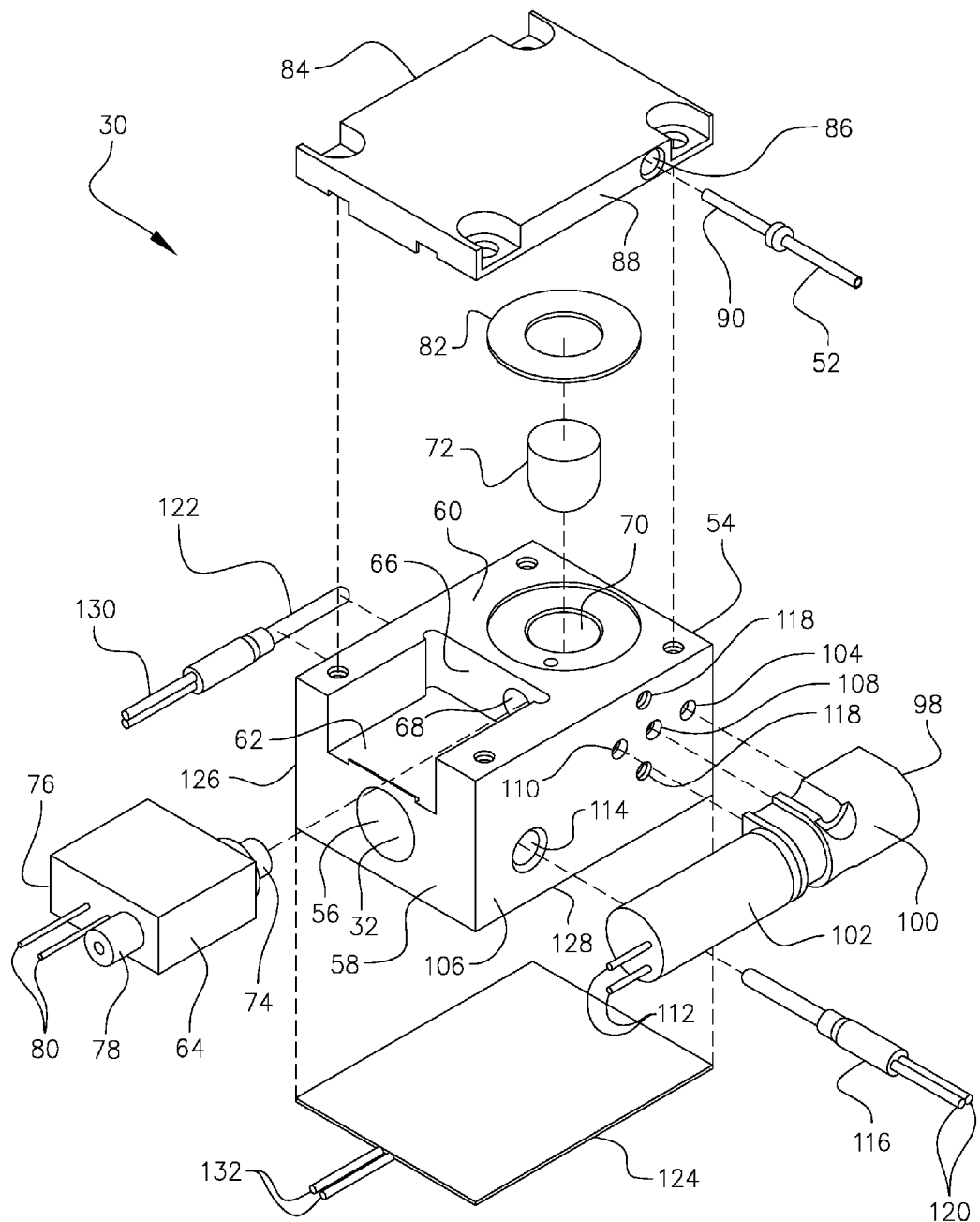
FIG. 7 is an exploded view of the breath sampling housing.
Figure 8:
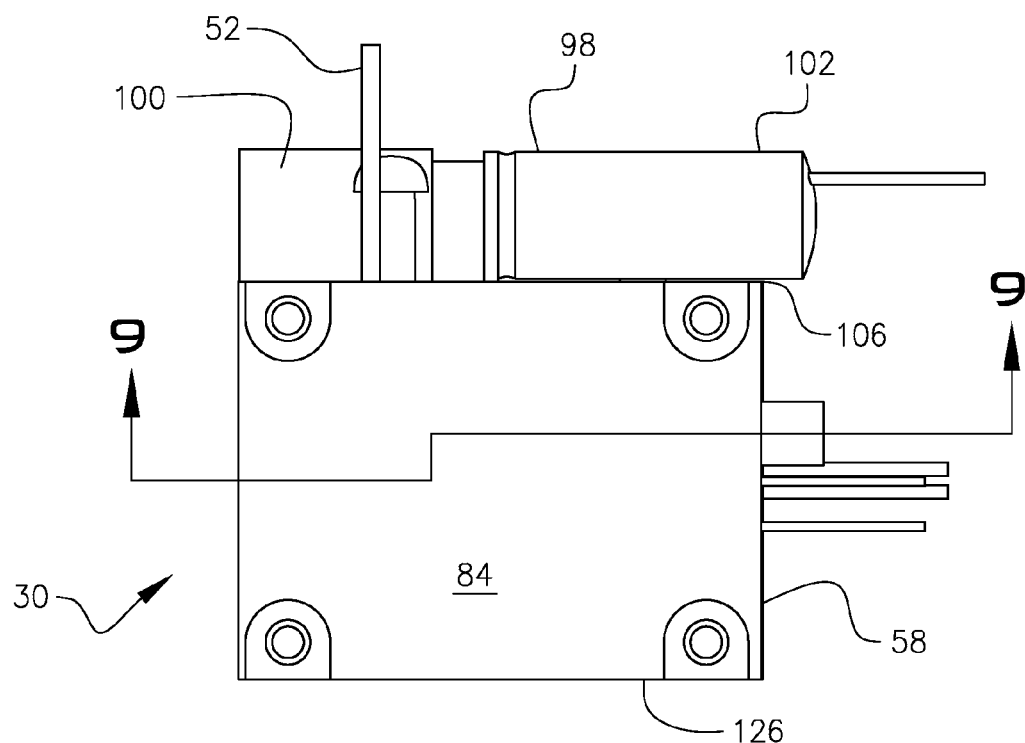
FIG. 8 is a left side elevational view of the breath sampling housing.

Referring now to FIG. 7, an exploded view of breath sampling housing 30 is shown illustrating the components used therein. Breath sampling housing 30 includes a body portion 54 having a first channel 56 (see also FIG. 9) formed there through. Body portion 54 is rectangular-shaped and includes a front end 58 and a top side 60 which has a cut-away portion 62 which seats a fuel cell 64. In the preferred embodiment, fuel cell 64 is a dry electrochemical fuel cell which operates by producing an electrical signal in response to a chemical reaction across the cell (the difference in the chemical reaction). Fuel cell 64 is employed as an alcohol specific fuel cell.

A dry electrochemical fuel cell is preferred over other fuel cells, such as thermo-based cells, although nothing herein limits the use of other known fuel cells that are capable of measuring the presence of alcohol.

With continuing reference to FIG. 7, along a back wall 66 of cut-away portion 62, is a second channel 68 formed in body portion 54 which communicates with a passageway 70 and an entrance port 74 of fuel cell 64. Passageway 70 also seats a water filter 72. On an opposed side 76 of fuel cell 64 from that of fuel cell entrance port 74 is an exhaust port 78 and a pair of electrical contacts 80 which bundle together and communicate with PCB 25 through first connector 40. Of the two electrical contacts 80 of fuel cell 64, one provides power to fuel cell 64 while the other provides a pathway to send an electrical signal to PCB 25. Water filter 72 sits within passageway 70 and is held down by a gasket 82 which in turn is held down by a cover 84. Cover 84 attaches to body portion top side 60 by screws and also works to enclose and retain fuel cell 64 seated within cut-away portion 62. Cover 84 has a small aperture 86 formed along a right side wall 88 for receiving a distal end 90 of capillary tube 52. A proximal end 92 of capillary tube 52 is attached to pressure transducer 46 at an entrance port 94 thereon (see FIG. 6). Aperture 86 communicates with passageway 70 for permitting a small portion of the gas sample to reach pressure transducer 46 through capillary tube 52. Water filter 72 is constructed from a cork-like or sponge-like material and works to eliminate water from the gas sample while permitting alcohol vapors to pass through to fuel cell 64. The elimination or reduction of water from the gas sample ensures that fuel cell 64 is not exposed to excessive moisture which can lead to cell saturation which in turn can lead to faulty readings and cell failure.

As shown in FIG. 7, breath sampling housing also contains a solenoid valve 98 having a mounting head 100 and a valve portion 102 in air passageway communication. Solenoid valve 98 is a normally open valve. Mounting head 100 has an outwardly extending peg (not shown) on an inner surface for inserting within a peg receiving aperture 104 formed in a right side wall 106 of breath sampling housing body portion 54. Two screw bores 118 are also formed in breath sampling housing body portion right side wall 106 for receiving a pair of screws and retaining solenoid valve 98 up against body portion 54. Also formed through breath sampling housing body portion right side wall 106, are an entrance channel 108 and an exhaust channel 110 for solenoid valve 98 which axially align with reciprocal entrance and exhaust ports (not shown) formed through the inner surface of solenoid valve mounting head 100 which then communicates with valve portion 102. Entrance channel 108 leads from passageway 70 behind water filter 72, while exhaust channel 110 leads to fuel cell entrance port 74 (see FIG. 9). Solenoid valve 98 also contains a pair of electrical contacts 112, a first for providing power to solenoid valve 98 and a second for receiving an electrical signal which forces the valve to remain open and then to close for a finite time as instructed by a microprocessor (to be discussed in further detail hereinafter). As stated above, solenoid valve 98 is normally open. This acts as a "fail-safe" feature in case the valve fails. It is not desirable for the interlock system of the present invention to a give a false negative reading, or a "Pass" result, if in fact the blood alcohol content of the test taker has exceeded the predetermined threshold. If the valve is closed and has failed, then the test result may be a "Pass" when in fact the test taker is actually intoxicated, or has at least exceeded the threshold setting for the particular interlock system, due to the fact that fuel cell 64 would not see any alcohol vapors pass across the cell. A false negative may then permit the vehicle to be operated by an intoxicated driver. In an alternate embodiment, the interlock system of the present invention includes a valve open/close position sensor to indicate if the valve is not in its correct position. In such alternate embodiment, the interlock system would be programmed such that a test could not be administered if the valve is in the wrong position. In the preferred embodiment, solenoid valve 98 is closed during the initialization process ("Warm-Up"), but then returns to a normally open state.

With continuing reference to FIG. 7, a temperature sensor bore 114 is also formed through breath sampling housing body portion right side wall 106 directly below valve portion 102 of solenoid valve 98. Temperature sensor bore 114 is in communication with breath sampling channel 32. A breath temperature sensor 116, such as a thermistor, is inserted within bore 114 and is used to measure the temperature of the gas sample entering breath sampling channel 32 (see FIG. 5), thereby ensuring that the gas sample is an actual human breath from that moment in time and not some other gas used in an attempt to circumvent the interlock system. Breath temperature sensor 116 also has a pair of electrical contacts 120 for providing power to sensor 116 and for providing a pathway for a signal generated in response to a temperature measurement made by sensor 116. The two electrical contacts 120 are bundled together and couple to PCB 25 at first connector 40.

With further reference to FIG. 7, breath sampling housing 30 also includes a housing temperature sensor 122 and a housing heater 124. Housing temperature sensor 122 mounts along a left side wall 126 of body portion 54, while housing heater 124 mounts along a bottom side 128 of body portion 54. In the preferred embodiment, housing temperature sensor 122 is also a thermistor and housing heater 124 is a strip of heating tape. A strip of tape (not shown) can be wrapped around body portion top and bottom sides, 60 and 128, and left side wall 126 to enclose and retain housing temperature sensor 122 and housing heater 124. Housing temperature sensor 122 also has a pair of electrical contacts 130 for providing power thereto and a pathway for an electrical signal in response to a temperature measurement made by temperature housing sensor 122. Housing heater 124 has a pair of electrical leads 132 for providing power thereto. Both the pair of contacts and the pair of leads, 130 and 132 respectively, are bundled together and connect to PCB 25 at first connector 40. Housing temperature sensor 122 is used to monitor the current temperature of breath sampling housing 30 while housing heater 124 is used to warm up breath sampling housing if the temperature of housing 30 is too cold to take an accurate measurement of an incoming gas sample.

Referring to FIG. 15, the manner in which a gas sample enters breath sampling housing 30 and is subsequently measured is illustrated. As shown, the interlock system of the present invention includes a microprocessor 134 (mounted on PCB 25 within handset 10). Microprocessor 134 is coupled to LED display screen 12. Those components enclosed within breath sampling housing 30 are shown to be within the dotted lines represented on FIG. 15, while those components attached to the outer walls of breath sampling housing are shown to be positioned juxtaposed the same dotted lines. As shown, a gas sample from a human breath enters breath sampling channel 32 of breath sampling housing 30 from breath intake channel entrance port 34. A portion of the gas sample enters passageway 70 and is filtered by water filter 72. A portion of that gas sample is directed away from passageway 70 through aperture 86, into capillary 52 and into pressure transducer 46 through pressure transducer entrance port 94 whereby a pressure reading is measured. The remaining water filtered gas sample is expelled from passageway 70 through entrance channel 108 and into solenoid valve 98. If the valve is open, the gas sample is permitted to pass through exhaust channel 110 and into fuel cell 64 at fuel cell entrance port 74. Any remaining un-needed gas sample is then expelled through fuel cell exhaust port 78.

With continuing reference to FIG. 15, it is shown that solenoid valve 98, fuel cell 64 and pressure transducer 46 are all in communication with microprocessor 134. Microprocessor 134 first initiates a warm-up procedure before any test is taken to stabilize handset 10. Not until LED display screen 12 says "Blow Now" (or some other like instruction), can a test be taken. At such time, a person blows into mouthpiece 26 (see FIG. 3). Microprocessor 134 instructs solenoid valve 98 to remain open for a finite period of time, for example, between 100 and 700 mS in response to detecting a minimal pressure measurement. This range allows for the accommodation of variable conditions. Fuel cell 64 measures the alcohol content of that gas sample and sends this measured reading to microprocessor 134. Some finite amount of time after solenoid valve 98 opens, pressure transducer 46 takes a pressure measurement. This pressure measurement is also sent to microprocessor 134. An algorithm embedded upon microprocessor 134 then calculates an offset value to apply to the measured value taken by fuel cell 64 to calculate a more accurate reading of the blood alcohol content of the gas sample. The results of this process are then used to determine whether the vehicle's ignition system can be engaged if the vehicle is powered off. A "Pass" or "Fail" message appears on LED screen display 12 depending on the results of the test. If the vehicle's power system is already running then the results of the test will be displayed on LED display screen 12, but power to the vehicle will not he disengaged. However, the novel interlock system of the present invention can sound the horn and flash the lights, if so desired, to draw attention to the rolling repeat test violator.

A dated data log is stored on microprocessor 134 in handset 10 and is used for recording a plurality of different events, including, but not limited to, when the interlock system was powered on and powered off, if any attempts at circumvention was attempted, results of all tests, if the vehicle's engine was idling for any amount of time, and if required tests where not performed when instructed by the interlock system (i.e., rolling repeat tests). The information in the data log can be downloaded to a PC, a laptop, personal digital assistant (PDA) or any other kind of like computing and digital storage device by interfacing with handset 10 through a data port 136 located along a side portion of handset 10 (see FIGS. 3, 4 and 6). In the preferred embodiment, data port 136 is a mini USB port. However, any type of known data port can be employed. Further, a wireless transceiver can be employed to download data from the data log using any known wireless transmitting technology. In addition to downloads, uploads can also be effected through data port 136 for calibrating the interlock system, for performing maintenance, for setting preferences and for updating the software embedded on microprocessor 134.

Figure 13:
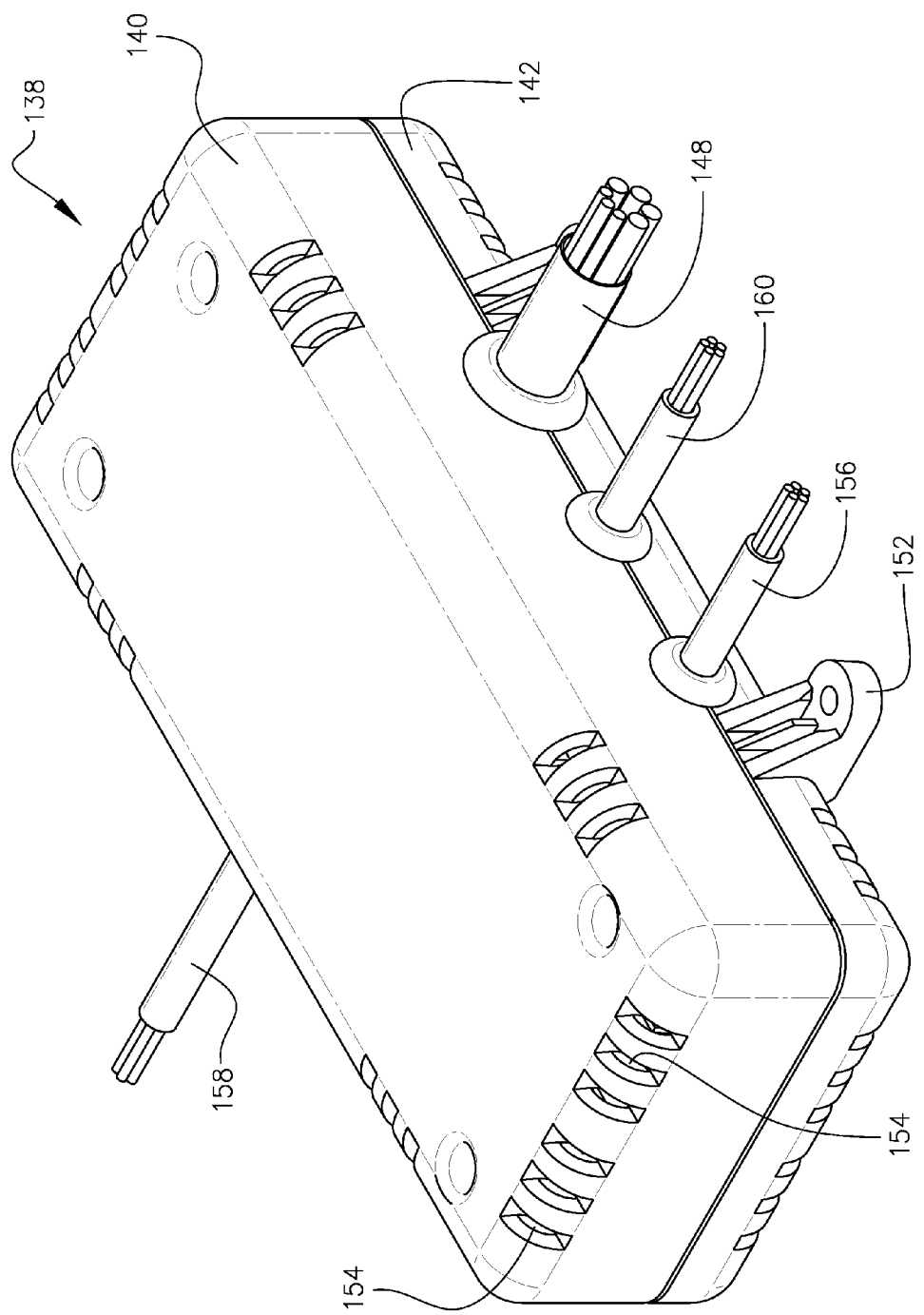
FIG. 13 is a perspective view of a base unit employed with the interlock system of the present invention.
Figure 14:
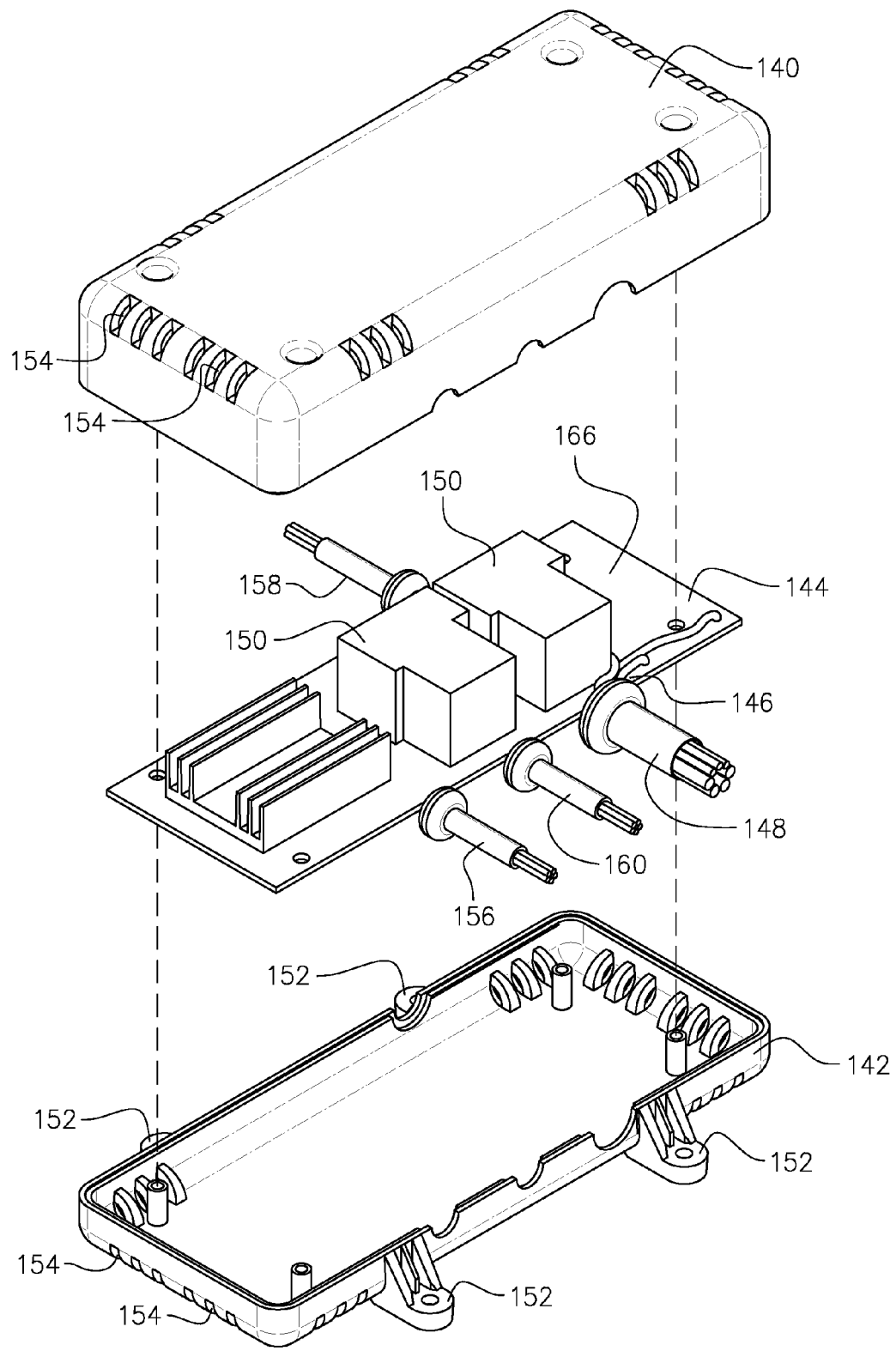
FIG. 14 is an exploded view of the base unit employed with the interlock system of the present invention.

As shown in FIG. 13, the interlock system of the present invention also includes a base unit 138. As shown in FIG. 14, base unit 138 includes a top and bottom housing member, 140 and 142 respectively, enclosing a printed circuit board (PCB) 144. Base unit 138 is coupled to handset 10 by a detachable bi-directional communicating cable 148 which terminates on PCB 144 at connector 146. In the preferred embodiment, PCB 144 has a pair of relays 150 mounted upon a top side 166 of PCB 144. The pair of relays 150 is connected in series with a starter mechanism (not shown) and the light and horn switching system of a vehicle. Relays 150 react in accordance with instructions received from microprocessor 134 which processes the gas sample test (sobriety test). Relays 150 permit the starting mechanism of a vehicle to operate if a person has passed the sobriety test and preclude the starting mechanism if the person has failed the sobriety test. Relays 150 are also used to sound the horn and flash the lights of the vehicle in response to a failed test during rolling operation of the vehicle. Additional relays could be employed within base unit 138 to operate or preclude operation of other features of a vehicle in response to a pass or failed test or to signal law enforcement or a supervising agency in response to a failed test.

Although the threshold of the sobriety test is adjustable, it is set by the manufacturer or supervising agency and can not be adjusted by the user of the interlock system. The sobriety threshold setting is affected by interfacing with a computing device through data port 136. In the preferred embodiment, the sobriety threshold is set at 0.03%. Base unit 138 can be mounted within the vehicle in a non-obtrusive location by a plurality of screws inserted through mounting wings 152. Top and bottom housing members, 140 and 142 respectively, of base unit 144 include a plurality of heat dissipation vents 154 formed throughout the outer peripheral of housing members 140 and 142.

With continuing reference to FIG. 14, it is shown that PCB 144 is provided power by cable 156 connected to a power source (not shown) of the vehicle in which the interlock system is mounted. A pair of auxiliary connectors, AUX 1 and AUX 2, 158 and 160 respectively, is coupled to PCB 144 for other interfacing uses, such as, for example, personal identification, such as a photographic device, and position location features. In the preferred embodiment, AUX 1 and AUX 2 are RS-232 ports, although other data interfacing ports can be employed. Examples of personal identification features include, but are not limited to, retina scans, voice recognition, fingerprint verification and dental imprints. Examples of position location features include cellular and satellite phone interface, GPS (Global Positioning System), LORAN and unique beacon indicators.

As stated earlier, the system of the present invention can also be used for personal individual location and identity verification for both offenders and non-offenders (i.e., willing participants) to verify location at a specific time and place and, if desired, determined blood alcohol content. For example, the system of the present invention could be used in a home, school or place of business merely to confirm that person's arrival and subsequent departure. The use of the feature of measuring the blood alcohol content could be incorporated when the system is used for adults when arriving at place of business. This type of system would work extremely well for airline pilots wherein the permitted level of blood to alcohol content that can be in their blood stream is set to a lower threshold, probably than any other profession. Further, the system could be used by parents of children who are granted certain privileges by their parents, such as operating a car, but currently use the trust of the child's word that they will not consume alcohol. Even if the child arrived home safely, the parent's could review the data logger and photos and know exactly who drove the car, where the children went and whether anyone failed the test.

Still further, the system of the present invention could be employed in the house of any type of offender who is ordered to remain inside the house (i.e., under house arrest). Aux ports AUX 1 and AUX 2, 158 and 160 respectively, in this scenario could be connected to a bevy of different measurement devices, including but not limited to, an atmospheric alcohol detection sensor and a transdermal sensor device.

Figure 16:
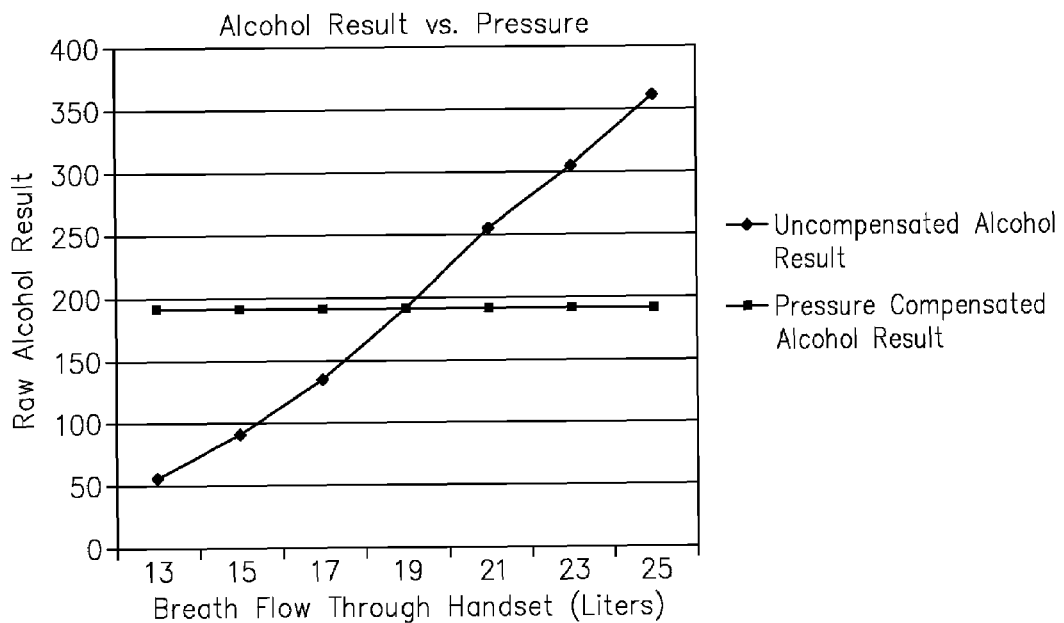
FIG. 16 is a first graph illustrating a raw alcohol measurement (test result) versus breath flow (pressure) through the handset.
Figure 17:
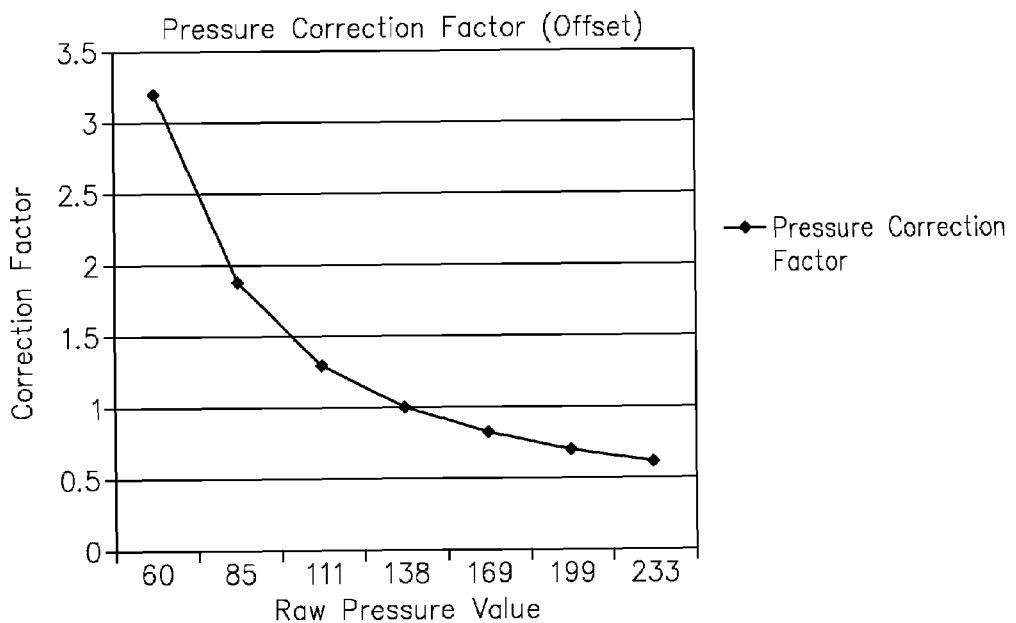
FIG. 17 is a second graph illustrating a pressure correction factor curve (offset) correlating to a raw pressure value.

Referring to FIGS. 16 and 17, it is shown how algorithmic pressure compensation is used in the interlock system of the present invention to provide an accurate measurement of the blood alcohol content of a person utilizing the system. As stated before, pressure transducer 46 does not control the opening and closing of solenoid valve 98 as seen in the prior art inventions. In the prior art, pressure transducers have been used to provide a constant volume of air to a fuel cell based upon fluctuating pressure by controlling the opening and closing of a valve upstream from a fuel cell. In the present invention, pressure transducer 46 and solenoid valve 98 operate independently from one another to provide a variable flow to fuel cell 64 based upon a threshold pressure being exceeded or not being met. An algorithmic offset is calculated in microprocessor 134 to provide a pressure compensated alcohol result that is constant, without regard to pressure, as shown in FIG. 16 as a flat line. As shown in FIG. 17, a correction factor, or offset, calculated by microprocessor 134 through the algorithm, is used to adjust the test result due to varying breath flow through handset 10. Pressure transducer 46 does not effect how long solenoid valve 98 stays open or how much breath flow is permitted to pass through to fuel cell 64. Pressure transducer 46 instead makes a measurement of the current breath flow, or pressure, and feeds that measurement to microprocessor 134 to calculate the offset. This prohibits someone from trying to fool the interlock system by introducing a low pressurized breath flow. Further, this novel approach to sampling the breath ensures that a high pressured breath flow does not saturate the fuel cell and give a false positive result.

Figure 18:
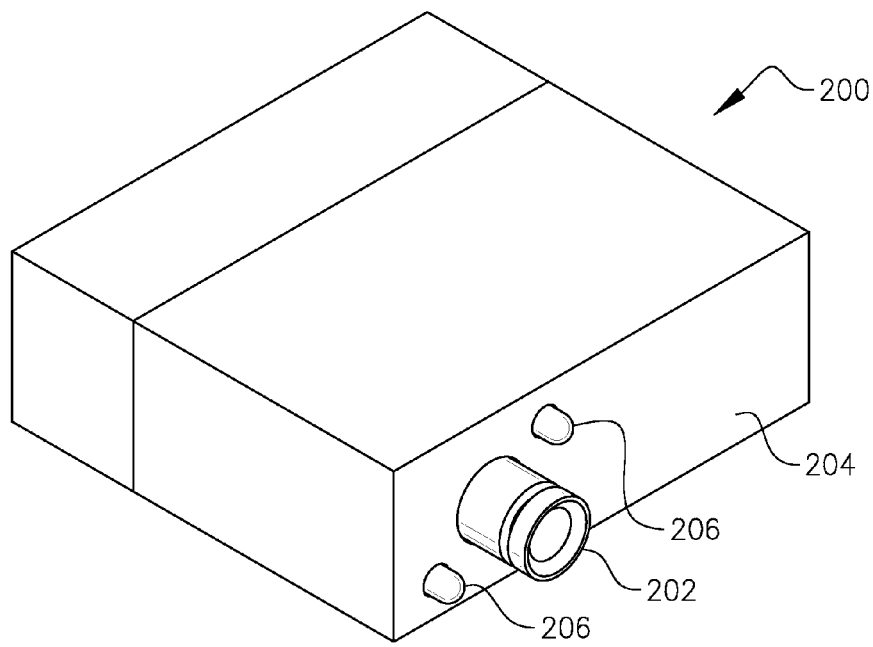
FIG. 18 is a front perspective view of a photographic system employed with the system of the present invention.

Referring now to FIG. 18, a photographic device 200 is shown having a camera lens 202 protruding from front face 204. A plurality of infrared diodes 206 are also provided to permit camera lens 202 to see in low light environmental situations (i.e., at night). In the preferred embodiment of the system utilizing the photographic device 200, a pair of infrared diodes 206 is employed.

Figure 19:
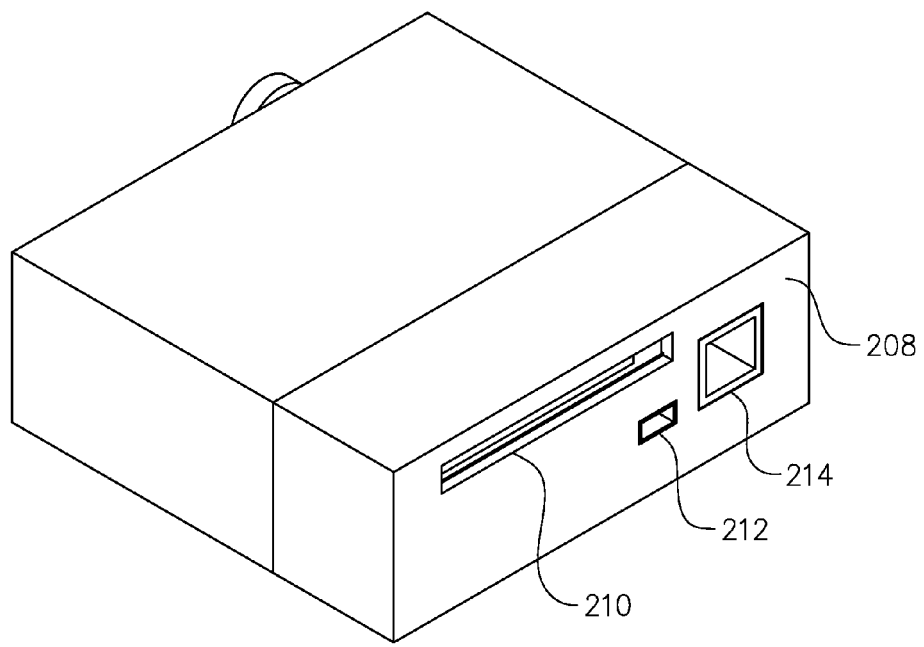
FIG. 19 is a rear perspective view of the photographic system employed with the system of the present invention.

Referring now to FIG. 19, a rear face 208 of photographic device 200 is shown having a slot 210 for accessing a removable memory card, a USB port 212 for interfacing with a computing device and data and power jack 214, such as an RJ45 jack. Any or all of slot 210, port 212 or jack 214 can be relocated on either side of the photographic device 200 if necessary. The back faced mounted positions is merely illustrative of the preferred embodiment.

Figure 20:
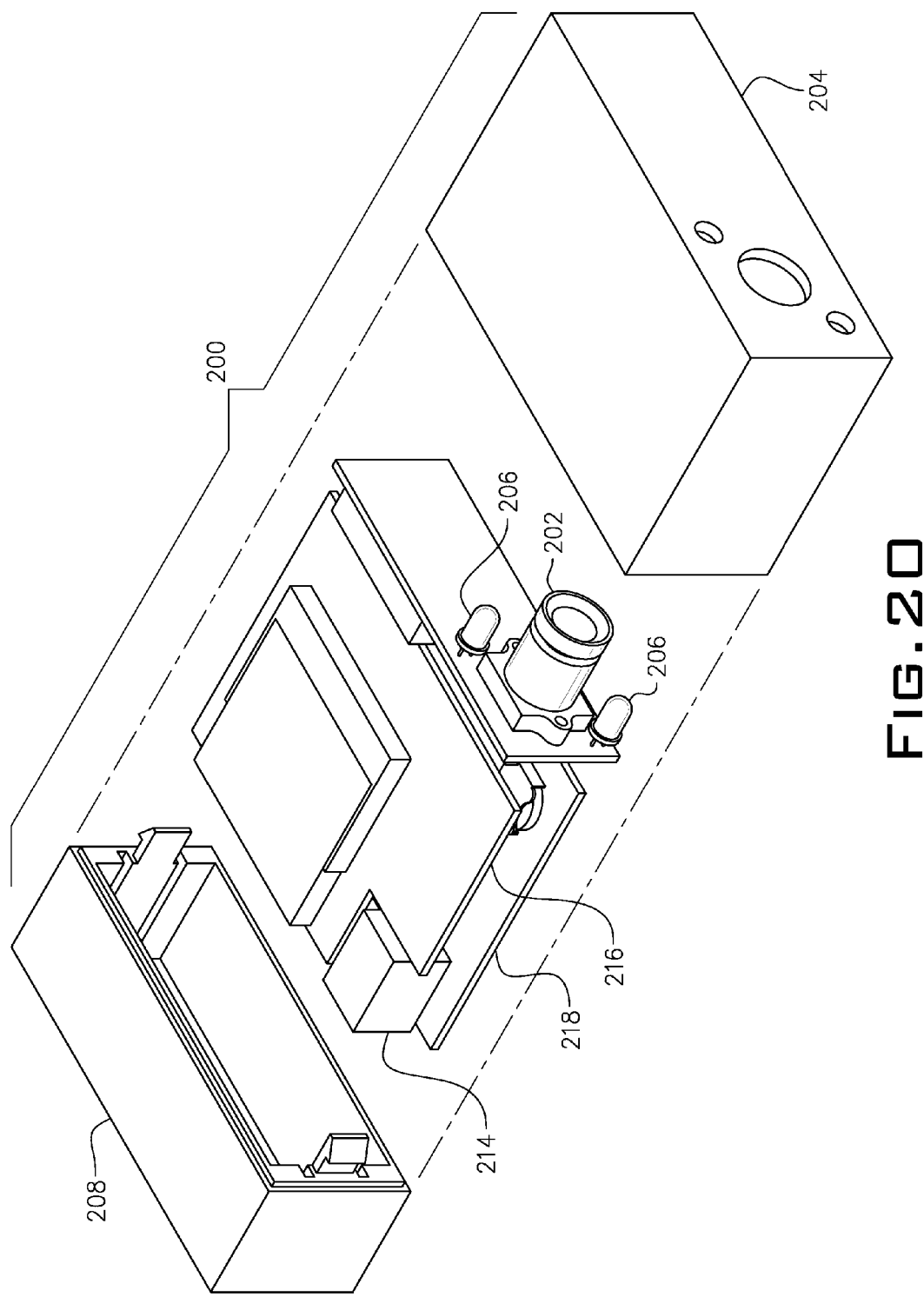
FIG. 20 is an exploded view of the photographic system employed with the system of the present invention.
Figure 21:
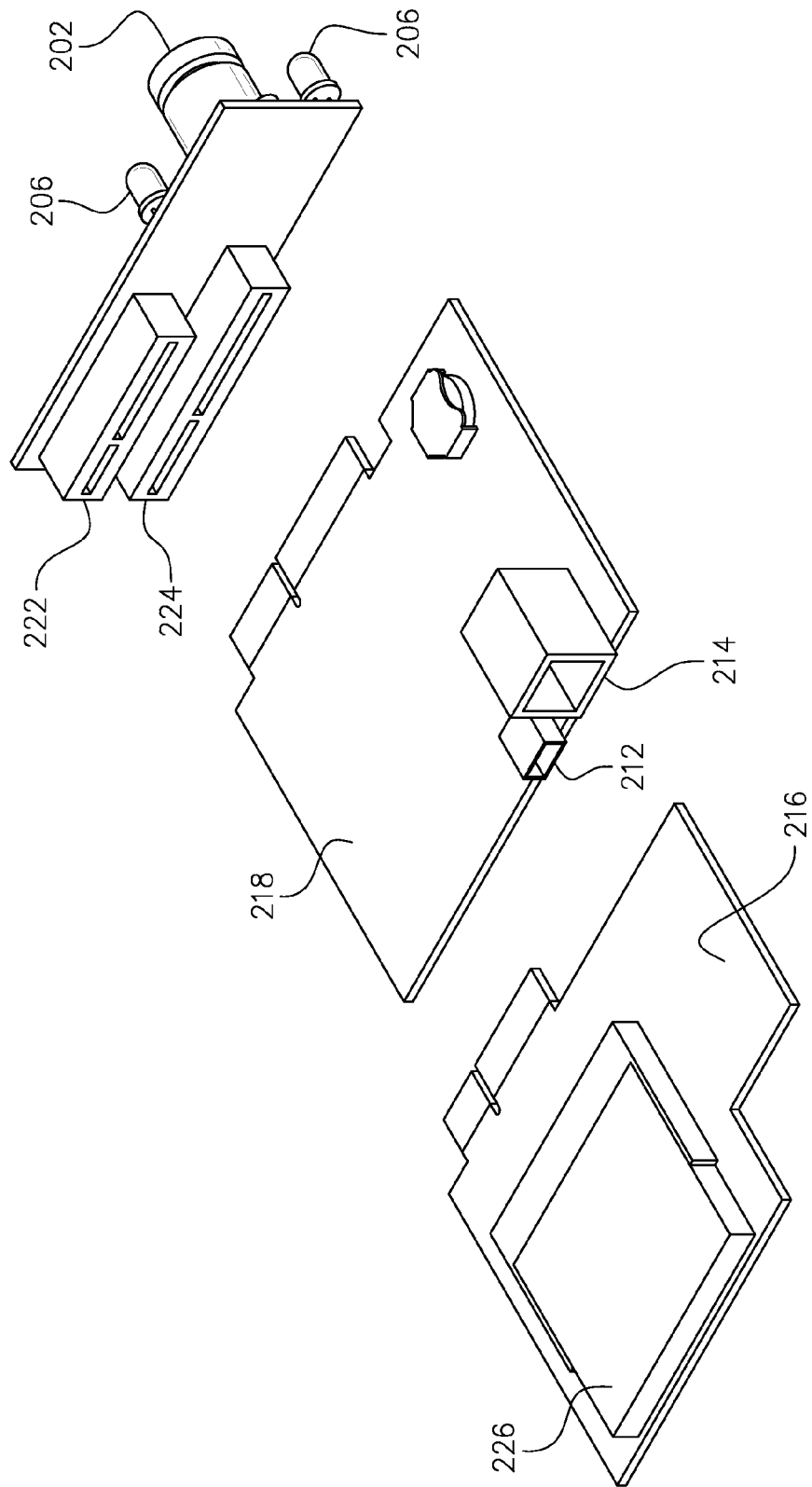
FIG. 21 is an exploded view of the electrical components of the photographic device employed with the system of the present invention.

Referring now to FIGS. 20 and 21, exploded views of photographic device 200 are shown and include a top and bottom circuit board, 216 and 218, respectively and a camera circuit board 220 mounted perpendicularly to top and bottom boards 216 and 218. Camera circuit board 220 has top and bottom electrical connection slots 222 and 224, respectively, for receiving top and bottom boards 216 and 218. Top board 216 receives a removable memory element 226, such as Flash memory in the preferred embodiment. Nothing herein limits the use of other known state of the art computing device memory chips, circuits, cards or the like. Memory element 226 is where pictures are stored taken by the novel system of the present invention with the photographic device 200. As stated before memory element 226 is removable and can be done so through slot 210 (see FIG. 19) and then used to interface with a computing device for review thereof.

Figure 22:
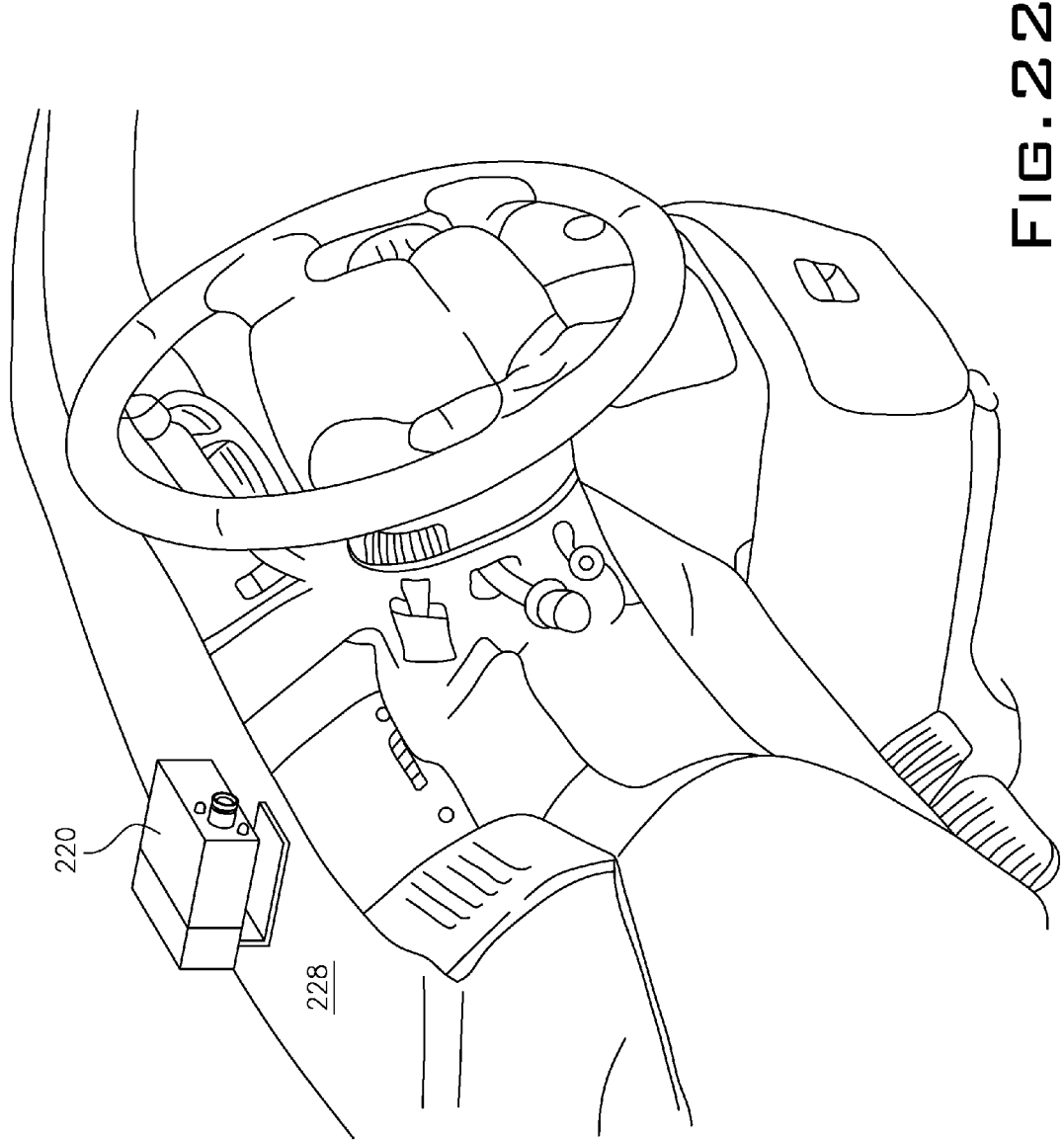
FIG. 22 is a perspective view of an operator area of a vehicle illustrating one location that the photographic device employed with the system of the present invention could be positioned.

Referring to FIG. 22, photographic device 200 is mounted on a dashboard 228 of a vehicle. This of course presumes that the system of the present invention is to be used with a vehicle, such as a car or truck. However, as stated before, the system of the present invention can be employed with a motorized apparatus, even one that is not operable by a steering wheel. For example, the system of the present invention could be used with a bevy of different motorized pieces of machinery which may or may not be stationary but require the operator to be free of any intoxicants. Further, nothing herein limits the system of the present invention from be used as a means for identifying a person and their location at a specific time, such as someone working in a secure environment or confined e.g. under house arrest. Even if the system is not being used in a real-time home scenario (i.e., alerts authorities to the fact that at this moment, the person is not in their house), it can be used to record the fact that there were not where they were supposed to be. This data can be later reviewed and used to revoke privileges or used as a violation of probation that causes incarceration in a correctional facility. The home system version can also be used to track the comings and goings of persons living in half-way houses who must remain free of intoxicants as a condition to be permitted to stay at such a facility.

Further to the embodiment of the system of the present invention employing the photographic device 200, it is important to note that said system records at least two photos at initial power up and at time of test and is not dependent on whether the test fails or not. Therefore, it operates an absolute identification system. Further, the present system is not limited to taking photos upon being prompted by audible signals as in the prior art. In fact, it is contemplated, and therefore can be employed in various embodiments, that the photos are being taken without the knowledge of the exact moment of the process. In that way, the person can not try and circumvent the picture taking process. The infrared diodes further this capability and also provide safety to the operator by avoiding the use of a flash element which could frighten the operator or cause them to temporarily lose their vision. Each photo taken is date and time stamped and given a unique serial number that is recorded in the datalogger of the system. This way all photos can be matched with the actual blood alcohol content tests that are also recorded in the system datalogger. Also, as with the handset, the photographic device 200 is connected to the base unit 138 through a bi-directional communicating cable.

Various formats of picture recording can be employed and include, but are not limited to, digital stills, film, analog and digital video, real-time video and still picture broadcast and real-time video and still picture data network transfer.

In an alternate embodiment, the novel interlock system of the present invention can be removed from a vehicle and brought within the confines of a residence or commercial establishment. Accordingly, the novel interlock system of the present invention could be used as a home monitoring system. In such alternate embodiment, handset 10 couples to an alternate power source within the residence or commercial establishment through a power coupler. Base unit 138 can remain in the vehicle since the output relays will not be used to control a vehicle starter or ignition system. However, signaling devices within the home may be controlled and would therefore warrant removal of base unit 138 from the vehicle to be wired to said signaling devices. Handset 10 can easily interface with a home computer through data port 136 to download data logs and upload preferences and settings and software updates and to conduct scheduled calibration and/or maintenance. An example of how this alternate system would work in a home monitoring environment is as follows: the offender stands in front of a web cam while the interlock system is connected to a home computer; software installed on the home computer takes a digital picture or movie of the offender taking the test; the time is stamped on the picture or movie along with the results of the test; the test results are then transmitted to a host computer (supervising agency) over the Internet, by a proprietary hard-wired connection or by wireless transmission. The software can additionally be programmed to immediately notify a predetermined monitoring service or agency in the event of a failed or refused test.

Equivalent elements can be substituted for the ones set forth above such that they perform in the same manner in the same way for achieving the same result.

The invention claimed is:

1. A sobriety interlock system having an output coupled to a starter mechanism of a motorized apparatus for detecting the presence of alcohol in a breath sample of an individual introduced into said system, the sobriety interlock system preventing the motorized apparatus from being started if said apparatus is not yet operational and if said individual does not provide a passing sample from said breath sample, or, if said motorized apparatus is already operational, the sobriety interlock system recording a level of blood-alcohol content of the individual, the sobriety interlock system comprising:
   a) a handset having a gas intake channel for receiving the breath sample;
   b) a breath sampling housing enclosed within the handset and having a gas sampling channel in axial alignment with the handset gas intake channel;
   c) a fuel cell positioned along the gas sampling channel of the breath sampling housing for measuring an alcohol vapor value of the breath sample;
   d) a pressure transducer located within the handset in fluid communication with the gas sampling channel of the breath sampling housing for measuring a pressure value of the breath sample;
   e) a microprocessor located within the handset in electrical communication with the fuel cell and the pressure transducer, the microprocessor containing an executable algorithm for determining a measured blood-alcohol content of the breath sample through an offset adjustment of the measured alcohol vapor value in relation to the measured breath sample pressure value;
   f) a solenoid valve positioned upstream from the fuel cell along the gas sampling channel of the breath sampling housing for limiting the size of the breath sample across the fuel cell by opening for a finite period of time, the solenoid valve having a normally open state;
   g) a photographic device for recording at least a first image on a storage medium before the breath sample is introduced into the handset gas intake channel; and
   h) a power source coupled to the handset and the photographic device.

2. The sobriety interlock system of claim 1, wherein the photographic device comprises at least one data interface port for connection to a computing device.

3. The sobriety interlock system of claim 1, wherein the storage medium is a memory device disposed within a housing of the photographic device.

4. The sobriety interlock system of claim 1, wherein the photographic device comprises a removable memory card.

5. The sobriety interlock system of claim 4, wherein the removable memory card is Flash Memory.

6. The sobriety interlock system of claim 1, wherein the photographic device comprises a single port for connection to the base unit providing bi-directional communication with said base unit and for deriving power from said power source.

7. The sobriety interlock system of claim 1, wherein the photographic device comprises a means for illuminating a low light level environment in and around an area defined as the operational position for said motorized apparatus.

8. The sobriety interlock system of claim 7, wherein the means for illuminating a low light level environment is a plurality of infrared diodes positioned around a lens of the photographic device.

9. The sobriety interlock system of claim 1, wherein a format of recording for the photographic device includes digital stills, film, analog and digital video, real-time video and still picture broadcast and real-time video and still picture data network transfer.

10. The sobriety interlock system of claim 1, wherein the photographic unit records the first image and a second image before the individual is capable of engaging the starter mechanism of the motorized apparatus, the second image being recorded as the breath sample is being introduced into the handset gas intake channel.

11. The sobriety interlock system of claim 10, wherein the starter mechanism of the motorized apparatus can not be engaged if a predetermined amount of time elapses between the recording of the first and second images by the photographic device.

12. The sobriety interlock device of claim 1, wherein the starter mechanism of the motorized apparatus can not be engaged if a predetermined amount of time elapses between the recording of the first image and the providing of the breath sample by the individual.

13. The sobriety interlock system of claim 1, wherein a current date and time and a unique serial number is associated with every recorded image and every test result of which are stored in the storage medium.

14. The sobriety interlock system of claim 1, wherein position location identification of the individual is recorded when a breath sample is provided.

15. The sobriety interlock system of claim 1, wherein the starter mechanism of the motorized apparatus is already engaged thereby making the motorized apparatus operational, the sobriety interlock system further comprising a means for determining the current blood-alcohol content of the individual operating said motorized apparatus.

16. The sobriety interlock system of claim 15, wherein the means for determining the current blood-alcohol content of the individual operating said motorized apparatus comprises a retest of a breath sample of the individual, the photographic device recording a further image of the individual as the breath sample is introduced into the handset gas intake channel for said retest.

17. The sobriety interlock system of claim 1, wherein the microprocessor applies a signal to the interlock system output dependent on the measured blood-alcohol content of the breath sample as compared to a predetermined threshold level of said system if the motorized apparatus is currently in a non-operational state.

18. The sobriety interlock system of claim 1, further comprising a temperature sensor disposed within the gas sampling channel of the breath sampling housing for measuring the breath sample introduced into the interlock system, the temperature sensor electrically coupled to the microprocessor.

19. The sobriety interlock system of claim 1, further comprising a water filter mounted within a passageway in fluid communication with the gas sampling channel of the breath sampling housing upstream from the fuel cell, the water filter eliminating water from the breath sample while permitting alcohol vapors to pass through to the fuel cell.

20. The sobriety interlock system of claim 1, further comprising at least one accelerometer for measuring movement of the motorized apparatus.

21. The sobriety interlock system of claim 20, wherein the motorized apparatus includes vehicles, automobiles, motorcycles, trucks, buses, airplanes, boats and other similar vehicles that are operational by a driver.

22. The sobriety interlock system of claim 1, wherein the motorized apparatus includes machinery requiring an operator for use thereof.

23. The sobriety interlock system of claim 1, further comprising a display screen electrically coupled to the microprocessor for displaying messages relative to the operation and test results of the interlock device.

24. The sobriety interlock system of claim 1, further comprising:
   a) a housing sensor for measuring the temperature of the breath sampling housing, the housing sensor mounted juxtaposed an outer side wall of the breath sampling housing and electrically coupled to the microprocessor, and
   b) a housing heater for increasing the temperature of the breath sampling housing when the temperature of the housing falls below a predefined tolerant level temperature, the housing heater mounted along a bottom side of the breath sampling housing and electrically coupled to the microprocessor.

25. The sobriety interlock system of claim 1, further comprising a base unit electrically coupled to the handset, the base unit including the output for the interlock system and having a microprocessor for interfacing with the handset microprocessor and receiving the signal dependent on the results of the measured blood-alcohol content as compared to predetermined threshold level of the interlock system.

26. The sobriety interlock system of claim 1, wherein the output of the interlock system comprises at least one relay.

27. The sobriety interlock system of claim 1, further comprising a data log stored on a computing device readable storage medium of the handset, the data log accessible through the data interfacing means of the handset.

28. The sobriety interlock system of claim 1, further comprising a plurality of auxiliary connection ports of the base unit.

29. The sobriety interlock system of claim 28, wherein the photographic device is connected to the base unit through one of the plurality of auxiliary connection ports.

30. The sobriety interlock device of claim 1, wherein the photographic device further comprising a housing enclosing a camera lens, the storage medium, low light illumination means, a power and data jack and a computing device data interface jack.

31. A method of measuring the sobriety of an operator of a motorized apparatus, the motorized apparatus having a starter mechanism in a normally disengaged state, said starter mechanism engaging if a predetermined threshold of blood to alcohol content is not exceeded during the measurement process, the steps of the method comprising:
   a) providing an interlock device for coupling to the motorized apparatus starter mechanism, the interlock device having a handset for use in receiving a breath sample of the motorized apparatus operator, a microprocessor controlled base unit for interfacing with said handset and a predefined threshold level for a permitted blood to alcohol content for the operator;
   b) providing a photographic device having a low light illumination means, a camera lens and a photo memory storage medium, the photographic device interfacing with the interlock device base unit;
   c) providing power to the interlock device;
   d) recording a first photograph of the operator of the motorized apparatus non-responsive to the measurement process of the blood alcohol content;
   e) prompting the operator to provide a breath sample;
   f) providing a breath sample into the handset of the interlock device;
   g) recording a second photograph of the operator at a moment substantially simultaneously with the step of providing the breath sample;
   h) measuring the blood alcohol content of the breath sample;
   i) comparing the measured blood alcohol content of he breath sample against the predefined threshold level for permitted blood to alcohol content for the operator; and
   h) affecting the starter mechanism of the motorized apparatus based upon a pass or fail of the comparison step.

32. The method of claim 31, further comprising requiring a retest of the operator's blood to alcohol content if the starter mechanism of the motorized apparatus was re-engaged.

33. The method of the claim 32, further comprising recording a photograph during the step of requiring a retest of the operator's blood to alcohol content.

* * * * *